US006958704B2

(12) United States Patent
Vinegar et al.

(10) Patent No.: US 6,958,704 B2
(45) Date of Patent: Oct. 25, 2005

(54) PERMANENT DOWNHOLE, WIRELESS, TWO-WAY TELEMETRY BACKBONE USING REDUNDANT REPEATERS

(75) Inventors: Harold J. Vinegar, Houston, TX (US); Robert Rex Burnett, Katy, TX (US); William Mountjoy Savage, Houston, TX (US); Frederick Gordon Carl, Jr., Houston, TX (US); James William Hall, Rijswijk (NL); John Michele Hirsch, Houston, TX (US)

(73) Assignee: Shell Oil Company, Houston, TX (US)

( * ) Notice: Subject to any disclaimer, the term of this patent is extended or adjusted under 35 U.S.C. 154(b) by 216 days.

(21) Appl. No.: 10/645,276

(22) Filed: Aug. 21, 2003

(65) Prior Publication Data

US 2004/0263350 A1 Dec. 30, 2004

Related U.S. Application Data

(62) Division of application No. 09/768,655, filed on Jan. 24, 2001, now Pat. No. 6,633,236.
(60) Provisional application No. 60/177,999, filed on Jan. 24, 2000, provisional application No. 60/186,376, filed on Mar. 2, 2000, provisional application No. 60/178,000, filed on Jan. 24, 2000, provisional application No. 60/186,380, filed on Mar. 2, 2000, provisional application No. 60/186,505, filed on Mar. 2, 2000, provisional application No. 60/178,001, filed on Jan. 24, 2000, provisional application No. 60/177,883, filed on Jan. 24, 2000, provisional application No. 60/177,998, filed on Jan. 24, 2000, provisional application No. 60/177,997, filed on Jan. 24, 2000, provisional application No. 60/181,322, filed on Feb. 9, 2000, provisional application No. 60/186,504, filed on Mar. 2, 2000, provisional application No. 60/186,379, filed on Mar. 2, 2000, provisional application No. 60/186,394, filed on Mar. 2, 2000, provisional application No. 60/186,382, filed on Mar. 2, 2000, provisional application No. 60/186,503, filed on Mar. 2, 2000, provisional application No. 60/186,527, filed on Mar. 2, 2000, provisional application No. 60/186,393, filed on Mar. 2, 2000, provisional application No. 60/186,394, filed on Mar. 2, 2000, provisional application No. 60/186,531, filed on Mar. 2, 2000, provisional application No. 60/186,377, filed on Mar. 2, 2000, provisional application No. 60/186,381, filed on Mar. 2, 2000, and provisional application No. 60/186,378, filed on Mar. 2, 2000.

(51) Int. Cl.$^7$ ................................................. B01V 3/00
(52) U.S. Cl. ............................... 340/854.3; 340/854.4; 340/854.8; 166/65.1; 166/73; 367/82; 307/12; 307/326
(58) Field of Search ........................ 166/369, 53, 65.1, 166/73; 340/854.4, 854.3, 854.8; 367/82; 307/12, 326

(56) References Cited

U.S. PATENT DOCUMENTS 3,659,336 A * 5/1972 Horne .......................... 29/605

(Continued)

Primary Examiner—Albert K. Wong

(57) ABSTRACT

A system and method of communicating among devices via a piping structure using at least one induction choke about the piping structure to route a time-varying current carrying communication signals between the devices. A communications system comprises a piping structure, a first communication device, a second communication device, and an induction choke. The piping structure comprises a first location, a second location, and an electrically conductive portion extending between the first and second locations. The first and second locations are distally spaced along the piping structure. The first and second communication devices are each electrically connected to the electrically conductive portion of the piping structure along the first location and second location, respectively, and each is adapted to send and receive communication signals via time-varying current. The induction choke is located about an electrically choked portion of the electrically conductive portion of the piping structure, such that the induction choke is adapted to route time-varying current within the piping structure between the electrical connection location for the first communication device and the electrical connection location for the second communication device, and such that the first communication device can communicate with the second communication device via the piping structure. A preferred application of the present invention is a well for producing petroleum products (e.g., oil, natural gas), comprising a communication system as described above.

13 Claims, 13 Drawing Sheets

U.S. PATENT DOCUMENTS

| | | | | |
|---|---|---|---|---|
| 4,790,375 A | * | 12/1988 | Bridges et al. | 166/60 |
| 5,216,285 A | * | 6/1993 | Hilsenteger et al. | 307/12 |
| 5,326,970 A | * | 7/1994 | Bayless | 250/269.1 |
| 6,128,508 A | * | 10/2000 | Francisco et al. | 455/552.1 |
| 6,344,781 B1 | * | 2/2002 | Slenker | 333/181 |

* cited by examiner

PERMANENT DOWNHOLE, WIRELESS, TWO-WAY TELEMETRY BACKBONE USING REDUNDANT REPEATERS

CROSS-REFERENCES TO RELATED APPLICATIONS

This is a division of application Ser. No. 09/768,655 filed Jan. 24, 2001, the entire disclosure of which is hereby incorporated by reference This application claims the benefit of the U.S. Provisional Applications in the following table, all of which are hereby incorporated by reference:

| U.S. PROVISIONAL APPLICATIONS | | | |
|---|---|---|---|
| T&K # | Ser. No. | Title | Filing Date |
| TH 1599 | 60/177,999 | Toroidal Choke Inductor for Wireless Communication and Control | Jan. 24, 2000 |
| TH 1599x | 60/186,376 | Toroidal Choke Inductor for Wireless Communication and Control | Mar. 2, 2000 |
| TH 1600 | 60/178,000 | Ferromagnetic Choke in Wellhead | Jan. 24, 2000 |
| TH 1600x | 60/186,380 | Ferromagnetic Choke in Wellhead | Mar. 2, 2000 |
| TH 1601 | 60/186,505 | Reservoir Production Control from Intelligent Well Data | Mar. 2, 2000 |
| TH 1602 | 60/178,001 | Controllable Gas-Lift Well and Valve | Jan. 24, 2000 |
| TH 1603 | 60/177,883 | Permanent, Downhole, Wireless, Two-Way Telemetry Backbone Using Redundant Repeater, Spread Spectrum Arrays | Jan. 24, 2000 |
| TH 1668 | 60/177,998 | Petroleum Well Having Downhole Sensors, Communication, and Power | Jan. 24 2000 |
| TH 1669 | 60/177,997 | System and Method for Fluid Flow Optimization | Jan. 24, 2000 |
| TS6185 | 60/181,322 | Optimal Predistortion in Downhole Communications System | Feb. 9, 2000 |
| TH 1671 | 60/186,504 | Tracer Injection in a Production Well | Mar. 2, 2000 |
| TH 1672 | 60/186,379 | Oilwell Casing Electrical Power Pick-Off Points | Mar. 2, 2000 |
| TH 1673 | 60/186,394 | Controllable Production Well Packer | Mar. 2, 2000 |
| TH 1674 | 60/186,382 | Use of Downhole High Pressure Gas in a Gas Lift Well | Mar. 2, 2000 |
| TH 1675 | 60/186,503 | Wireless Smart Well Casing | Mar. 2, 2000 |
| TH 1677 | 60/186,527 | Method for Downhole Power Management Using Energization from Distributed Batteries or Capacitors with Reconfigurable Discharge | Mar. 2, 2000 |
| TH 1679 | 60/186,393 | Wireless Downhole Well Interval Inflow and Injection Control | Mar. 2, 2000 |
| TH 1681 | 60/186,394 | Focused Through-Casing Resistivity Measurement | Mar. 2, 2000 |
| TH 1704 | 60/186,531 | Downhole Rotary Hydraulic Pressure for Valve Actuation | Mar. 2, 2000 |
| TH 1705 | 60/186,377 | Wireless Downhole Measurement and Control For Optimizing Gas Lift Well and Field Performance | Mar. 2, 2000 |
| TH 1722 | 60/186,381 | Controlled Downhole Chemical Injection | Mar. 2, 2000 |

-continued

| U.S. PROVISIONAL APPLICATIONS | | | |
|---|---|---|---|
| T&K # | Ser. No. | Title | Filing Date |
| TH 1723 | 60/186,378 | Wireless Power and Communications Cross-Bar Switch | Mar. 2, 2000 |

The current application shares some specification and figures with the following commonly owned and concurrently filed applications in the following table, all of which are hereby incorporated by reference:

| COMMONLY OWNED AND CONCURRENTLY FILED U.S. PATENT APPLICATIONS | | | |
|---|---|---|---|
| T&K # | Ser. No. | Title | Filing Date |
| TH 1599US | 09/769047 | Choke Inductor for Wireless Communications and Control | Jan. 24, 2001 |
| TH 1600US | 09/769048 | Induction Choke for Power Disribution in Piping Structure | Jan. 24, 2001 |
| TH 1602US | 09/768705 | Controllable Gas-Lift Well and Valve | Jan. 24, 2001 |
| TH 1668US | 09/769046 | Petroleum Well Having Downhole Sensors, Communication, and Power | Jan. 24, 2001 |
| TH 1669US | 09/768656 | System and Method for Fluid Flow Optimization | Jan. 24, 2001 |

TECHNICAL FIELD OF THE INVENTION

The present invention relates to a system and method of communicating among devices via a piping structure using at least one induction choke about the piping structure to route a time-varying current carrying communication signals between the devices.

BACKGROUND OF THE INVENTION

Gas-lift wells have been in use since the 1800's and have proven particularly useful in increasing efficient rates of oil production where the reservoir natural lift is insufficient (see Brown, Connolizo and Robertson, *West Texas Oil Lifting Short Course* and H. W. Winkler, *Misunderstood or Overlooked Gas-lift Design and Equipment Considerations,* SPE, p. 351 (1994)). Typically, in a gas-lift oil well, natural gas produced in the oil field is compressed and injected in an annular space between the casing and tubing and is directed from the casing into the tubing to provide a "lift" to the tubing fluid column for production of oil out of the tubing. Although the tubing can be used for the injection of the lift-gas and the annular space used to produce the oil, this is rare in practice. Initially, the gas-lift wells simply injected the gas at the bottom of the tubing, but with deep wells this requires excessively high kick off pressures. Later, methods were devised to inject the gas into the tubing at various depths in the wells to avoid some of the problems associated with high kick off pressures (see U.S. Pat. No. 5,267,469).

The most common type of gas-lift well uses mechanical, bellows-type gas-lift valves attached to the tubing to regulate the flow of gas from the annular space into the tubing string (see U.S. Pat. Nos. 5,782,261 and 5,425,425). In a typical bellows-type gas-lift valve, the bellows is preset or pre-charged to a certain pressure such that the valve permits communication of gas out of the annular space and into the tubing at the pre-charged pressure. The pressure charge of each valve is selected by a well engineer depending upon the position of the valve in the well, the pressure head, the physical conditions of the well downhole, and a variety of other factors, some of which are assumed or unknown, or will change over the production life of the well.

Several problems are common with bellows-type gas-lift valves. First, the bellows often loses its pre-charge, causing the valve to fail in the closed position or changing its setpoint to operate at other than the design goal, and exposure to overpressure causes similar problems. Another common failure is erosion around valve seat 319 and deterioration of the ball stem in the valve. This leads to partial failure of the valve or at least inefficient production. Because the gas flow through a gas-lift valve is often not continuous at a steady state, but rather exhibits a certain amount of hammer and chatter as ball 318 rapidly opens and closes, ball and valve seat degradation are common, leading to valve leakage. Failure or inefficient operation of bellows-type valves leads to corresponding inefficiencies in operation of a typical gas-lift well. In fact, it is estimated that well production is at least 5–15% less than optimum because of valve failure or operational inefficiencies. Fundamentally these difficulties are caused by the present inability to monitor, control, or prevent instabilities, since the valve characteristics are set at design time, and even without failure they cannot be easily changed after the valve is installed in the well.

It would, therefore, be a significant advance if a system and method were devised which overcame the inefficiency of conventional bellows-type gas-lift valves. Several methods have been devised to place controllable valves downhole on the tubing string but all such known devices typically use an electrical cable along the tubing string to power and communicate with the gas-lift valves. It is often highly undesirable and in practice difficult to use a cable along the tubing string either integral with the tubing string or spaced in the annulus between the tubing and the casing because of the number of failure mechanisms present in such a system. Other methods of communicating within a borehole are described in U.S. Pat. Nos. 5,493,288; 5,576,703; 5,574,374; 5,467,083; 5,130,706.

U.S. Pat. No. 6,070,608 describes a surface controlled gas lift valve for use in oil wells. Methods of actuating the valve include electro-hydraulic, hydraulic, and pneumo-hydraulic. Sensors relay the position of the variable orifice and critical fluid pressures to a panel on the surface. However, when describing how electricity is provided to the downhole sensors and valves, the means of getting the electric power/signal to the valves/sensors is described as an electrical conduit that connects between the valve/sensor downhole and a control panel at the surface. U.S. Pat. No. 6,070,608 does not specifically describe or show the current path from the device downhole to the surface. The electrical conduit is shown in/the figures as a standard electrical conduit, i.e., an extended pipe with individual wires protected therein, such that the pipe provides physical protection and the wires therein provide the current path. But such standard electrical conduits can be difficult to route at great depths, around turns for deviated wells, along multiple branches for a well having multiple lateral branches, and/or in parallel with coil production tubing. Hence, there is a need for a system and method of providing power and communications signals to downhole devices without the need for a separate electrical conduit filled with wires and strung along side of production tubing.

U.S. Pat. No. 4,839,644 describes a method and system for wireless two-way communications in a cased borehole having a tubing string. However, this system describes a downhole toroid antenna for coupling electromagnetic energy in a waveguide TEM mode using the annulus between the casing and the tubing. This toroid antenna uses an electromagnetic wave coupling that requires a substantially nonconductive fluid (such as refined, heavy oil) in the annulus between the casing and the tubing as a transmission medium, as well as a toroidal cavity and wellhead insulators. Therefore, the method and system described in U.S. Pat. No. 4,839,644 is expensive, has problems with brine leakage into the casing, and is difficult to use for downhole two-way communication. Thus, a need exists for a better system and method of providing power and communications signals to downhole devices without the need for a nonconductive fluid to be present in the annulus between the casing and tubing.

Other downhole communication concepts, such as mud pulse telemetry (U.S. Pat. Nos. 4,648,471 and 5,887,657), have shown successful communication at low data rates but are of limited usefulness as a communication scheme where high data rates are required or it is undesirable to have complex, mud pulse telemetry equipment downhole. Still other downhole communication methods have been attempted, see U.S. Pat. Nos. 5,467,083; 4,739,325; 4,578,675; 5,883,516; and 4,468,665. Hence, there is a need for a system and method of providing power and communications signals to downhole devices at higher data rates and with available power to operate a downhole device.

It would, therefore, be a significant advance in the operation of petroleum wells if tubing, casing, liners, and/or other conductors installed in wells could be used for the communication and power conductors to control and operate devices and sensors downhole in a petroleum well.

Still other downhole permanent sensors and control systems have been attempted. See U.S. Pat. Nos. 5,730,219; 5,662,165; 4,972,704; 5,941,307; 5,934,371; 5,278,758; 5,134,285; 5,001,675; 5,730,219; and 5,662,165. It is desirable in many types of petroleum wells to be able to sense downhole conditions and to control conditions downhole. Surface indications of production conditions are useful, but feedback to determine optimum production of the well can take many hours and even days. Particularly in multilateral completions, it is desirable to sense operating conditions in each lateral and to be able to control the conditions in each lateral.

It would, therefore, be a significant advance in the operation of petroleum wells in general and gas-lift wells in particular, if sensors for determining flow characteristics in the well could work with controllable valves and surface controls to optimize operating parameters in a well. Generally, it would be a significant advance to provide for redundant communication and control capability to overcome noisy or lossy conditions in the well and provide for failure of individual communication devices. All references cited herein are incorporated by reference to the maximum extent allowable by law. To the extent a reference may not be fully incorporated herein, it is incorporated by reference for background purposes, and indicative of the knowledge of one of ordinary skill in the art.

SUMMARY OF THE INVENTION

The problems and needs outlined above are largely solved and met by the present invention. Accordingly, a system and method of communicating among devices via a piping structure using at least one induction choke about the piping structure to route a time-varying current carrying communication signals between the devices are provided.

In accordance with one aspect of the present invention, a communications system is provided. The communications system comprises a piping structure, a first communication device, a second communication device, and an induction choke. The piping structure comprises a first location, a second location, and an electrically conductive portion extending between the first and second locations. The first and second locations are distally spaced along the piping structure. The first and second communication devices are each electrically connected to the electrically conductive portion of the piping structure along the first location and second location, respectively, and each is adapted to send and receive communication signals via time-varying current. The induction choke is located about an electrically choked portion of the electrically conductive portion of the piping structure, such that the induction choke is adapted to route time-varying current within the piping structure between the electrical connection location for the first communication device and the electrical connection location for the second communication device, and such that the first communication device can communicate with the second communication device via the piping structure.

In accordance with another aspect of the present invention, a system for providing communications among devices in a well is provided. The system comprises a piping structure, a master communication device, a plurality of slave communication devices, and an induction choke. The piping structure is within the well and the piping structure has an electrically conductive portion. The master communication device is electrically connected to the electrically conductive portion of the piping structure, and the master communication device is adapted to send and receive communication signals via time-varying current. The plurality of slave communication devices is electrically connected to the electrically conductive portion of the piping structure, and the slave communication devices are adapted to send and receive communication signals via time-varying current. The induction choke is located about an electrically choked portion of the electrically conductive portion of the piping structure, such that the induction choke is adapted to route time-varying current within the piping structure between the electrical connection location for the master communication device and the electrical connection locations for the slave communication devices, and such that the master communication device can communicate with the slave communication devices via the piping structure. Also, at least two of the slave communication devices can communicate with each other via the piping structure.

In accordance with yet another aspect of the present invention, a communications system is provided. The communications system comprises a piping structure, a first communication device, an induction choke, an electrical current transformer, and a second communication device. The piping structure comprises a first location, a second location, and an electrically conductive portion extending between the first and second locations. The first and second locations are distally spaced along the piping structure. The first communication device is electrically connected to the electrically conductive portion of the piping structure along the first location, and the first communication device is adapted to send and receive communication signals via time-varying current. The induction choke is located about an electrically choked portion of the electrically conductive portion of the piping structure, such that the induction choke is adapted to route time-varying current within the piping structure between the electrical connection location for the first communication device and an electrical return. The electrical current transformer is located about part of the electrically conductive portion of the piping structure along the second location. The transformer is located along the piping structure between the electrical connection location for the first communication device and the induction choke, and the transformer is adapted to transform current flowing within the piping structure to an induced secondary current in the transformer. The second communication device is electrically connected to the transformer, such that the second communication device can communicate with the first communication device via the transformer and the piping structure.

In accordance with still another aspect of the present invention, a communication system for a petroleum well is provided. The communications system comprises a piping structure, a computer system, a downhole device, and an unpowered ferromagnetic induction choke. The piping structure comprises a first location, a second location, and an electrically conductive portion extending between the first and second locations. The piping structure is part of a petroleum production system for the petroleum well. The computer system is electrically connected to the electrically conductive portion of the piping structure along the first location. The computer system comprises a source of time-varying current and a first communication device. The first communication device is adapted to send and receive spread spectrum communication signals along the electrically conductive portion of the piping structure via time-varying current waveforms. The downhole device is electrically connected to the electrically conductive portion of the piping structure along the second location. The downhole device comprises a second communication device. The second communication device is also adapted to send and receive spread spectrum communication signals along the electrically conductive portion of the piping structure via time-varying current waveforms. The induction choke is located about an electrically choked portion of the electrically conductive portion of the piping structure, such that the choke is adapted to route time-varying current flowing within the electrically conductive portion of the piping structure between the computer system and the downhole device, and such that the first communication device can communicate with the second communication device via the electrically conductive portion of the piping structure. The downhole device can comprise a sensor that is adapted to take measurements and generate sensor data, and the computer system can be adapted to process the sensor data received from the first communication device via the second communication device.

In accordance with yet another aspect of the present invention, a petroleum well for producing petroleum products (e.g., oil, natural gas) is provided. The petroleum well comprises a piping structure, a first communication device, a second communication device, and an induction choke. The piping structure is part of the petroleum well system (e.g., production tubing and/or well casing). The piping structure comprises a first location, a second location, and an electrically conductive portion extending between the first and second locations. The first and second locations are distally spaced along the piping structure. The first communication device is electrically connected to the electrically conductive portion of the piping structure along the first location. The first communication device is adapted to send and receive communication signals via time-varying current. The second communication device is electrically connected to the electrically conductive portion of the piping structure along the second location. The second communication device is adapted to send and receive communication signals via time-varying current. The induction choke is located about an electrically choked portion of the electrically conductive portion of the piping structure. The induction choke is adapted to route time-varying current within the piping structure between the electrical connection location for the first communication device and the electrical connection location for the second communication device, such that the first communication device can communicate with the second communication device via the piping structure. The induction choke can comprise a ferromagnetic material, and it can be unpowered. The oil well may also comprise a controllable valve, where the controllable valve is electrically connected to the second communication device such that the valve can be remotely controlled via the second communication device.

In accordance with a further aspect of the present invention, a method of communicating with a remote device is provided. The method comprises the steps of providing an induction choke about a portion of a piping structure; generating a communication signal with a first communication device; transmitting the signal via a time-varying current along the piping structure using the first communication device; routing the time-varying current within the piping structure using the induction choke; and receiving the signal in the remote device via the time-varying current traveling within the piping structure. In the method, the communication signal can be a spread spectrum signal.

In accordance with another aspect of the present invention, a method of communicating with a downhole communication device in a well. The method comprises the steps of providing an induction choke about a portion of a piping structure in the well; generating a spread spectrum signal with a surface communication device; transmitting the signal via a time-varying current along the piping structure using the surface communication device; routing the time-varying current within the piping structure using the induction choke; and receiving the signal in the downhole communication device via the time-varying current traveling within the piping structure. The method may further comprise the steps of receiving the signal with a relay communication device located along the piping structure between the surface communication device and the downhole communication device; amplifying the signal with the relay communication device; and transmitting the signal along the piping structure using the relay communication device. Also, the method may further comprise the steps of generating another spread spectrum signal with the downhole communication device; transmitting the another signal via another time-varying current along the piping structure using the downhole communication device; routing the another time-varying current within the piping structure using the induction choke; and receiving the signal in the surface communication device via the piping structure.

BRIEF DESCRIPTION OF THE DRAWINGS

Other objects and advantages of the invention will become apparent upon reading the following detailed description and upon referencing the accompanying drawings, in which.

DETAILED DESCRIPTION OF THE INVENTION

Figure 1:
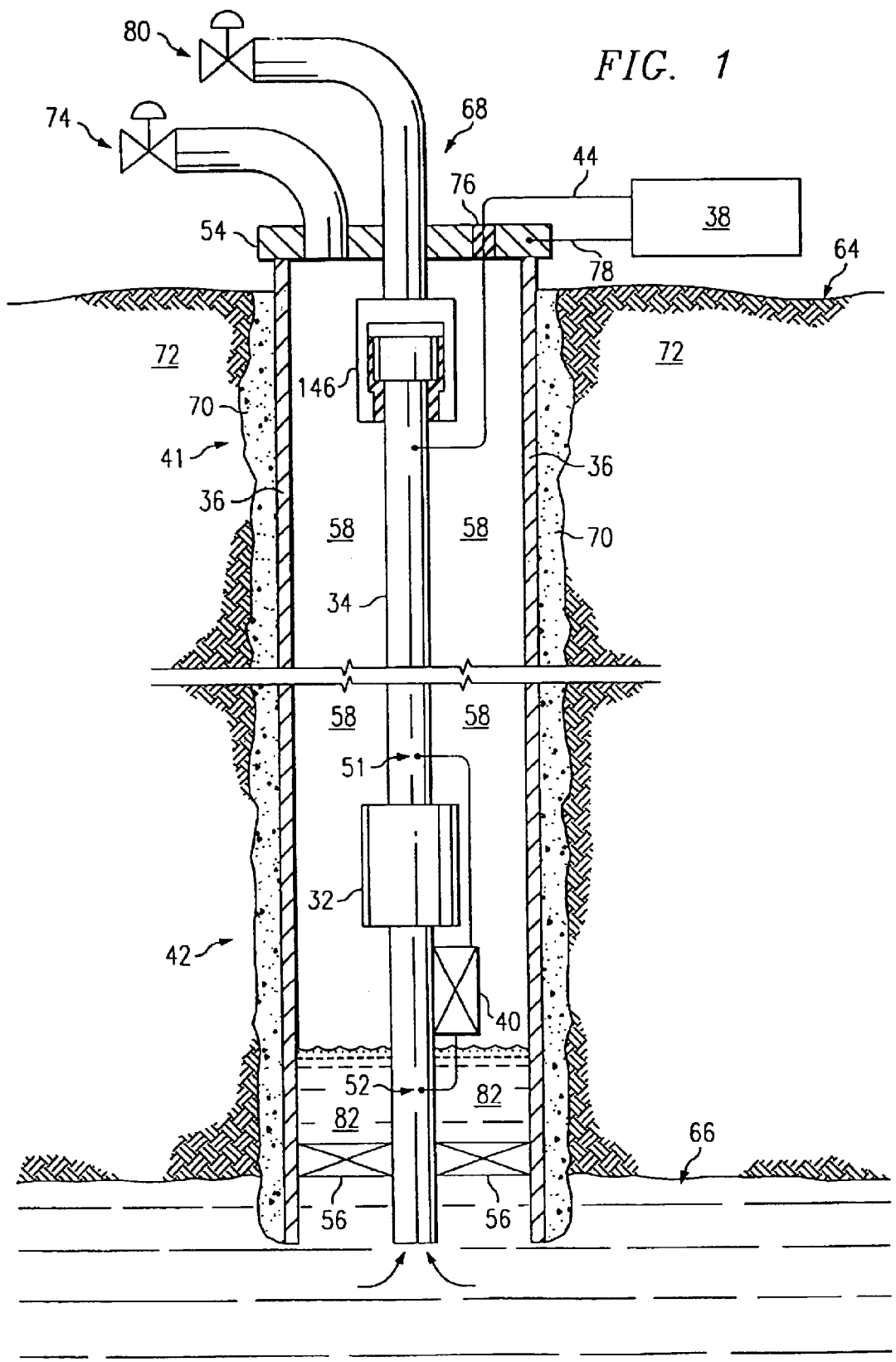
FIG. 1 is a schematic of a gas-lift petroleum well illustrating the general disposition of the major elements of the present invention in relation to the major elements of a conventional well.

Referring now to the drawings, wherein like reference numbers are used to designate like elements throughout the various views, several embodiments of the present invention are further described. The figures are not necessarily drawn to scale, and in some instances the drawings have been exaggerated or simplified for illustrative purposes only. One of ordinary skill in the art will appreciate the many possible applications and variations of the present invention based on the following examples of possible embodiments of the present invention and cited patents and articles incorporated by reference.

As used in the present application, a piping structure can be one single pipe, a tubing string, a well casing, a pumping rod, a series of interconnected pipes, rods, rails, trusses, lattices, supports, a branch or lateral extension of a well, a network of interconnected pipes, or other structures known to one of ordinary skill in the art. The preferred embodiment makes use of the invention in the context of an oil well where the piping structure comprises tubular, metallic, electrically-conductive pipe or tubing strings, but the invention is not so limited. For the present invention, at least a portion of the piping structure needs to be electrically conductive, such electrically conductive portion may be the entire piping structure (e.g., steel pipes, copper pipes) or a longitudinal extending electrically conductive portion combined with a longitudinally extending non-conductive portion. In other words, an electrically conductive piping structure is one that provides an electrical conducting path from a first location where a power source is electrically connected to a second location where a device and/or electrical return is electrically connected. The piping structure will typically be conventional round metal tubing, but the cross-section geometry of the piping structure, or any portion thereof, can vary in shape (e.g., round, rectangular, square, oval) and size (e.g., length, diameter, wall thickness) along any portion of the piping structure. Hence, a piping structure must have an electrically conductive portion extending from a first location of the piping structure to a second location of the piping structure.

The terms "first end" and "second end" as used herein are defined generally to call out a side or portion of a piping structure, which may or may not encompass the most proximate locations, as well as intermediate locations along a called out side or portion of the piping structure. Similarly, in accordance with conventional terminology of oilfield practice, the descriptors "upper", "lower", "uphole" and "downhole" refer to distance along the borehole from the surface, which in deviated wells may or may not accord with relative vertical placement measured with reference to the ground surface.

Also, the term "wireless" as used in this application means the absence of a conventional, insulated wire conductor e.g. extending from a downhole device to the surface. Using the tubing and/or casing as a conductor is considered "wireless."

Also, the term "modem" as used herein is not limited to conventional computer modems that convert digital signals to analog signals and vice versa (e.g., to send digital data signals over the analog Public Switched Telephone Network). For example, if a sensor puts out measurements in an analog format, then such measurements may only need to be used to modulate a carrier frequency and be transmitted—hence no analog/digital conversion is needed. As another example, a relay/slave modem or communication device may only need to identify, filter, amplify, and/or retransmit a signal received.

As used in the present application, a "valve" is any device that functions to regulate the flow of a fluid. Examples of valves include, but are not limited to, bellows-type gas-lift valves and controllable gas-lift valves, each of which may be used to regulate the flow of lift gas into a tubing string of a well. The internal workings of valves can vary greatly, and in the present application, it is not intended to limit the valves described to any particular configuration, so long as the valve functions to regulate flow. Some of the various types of flow regulating mechanisms include, but are not limited to, ball valve configurations, needle valve configurations, gate valve configurations, and cage valve configurations. The methods of installation for valves discussed in the present application can vary widely. Valves can be mounted downhole in a well in many different ways, some of which include tubing conveyed mounting configurations, side-pocket mandrel configurations, or permanent mounting configurations such as mounting the valve in an enlarged tubing pod.

The term "sensor" as used herein refers to any device that detects, determines, monitors, records, or otherwise senses the absolute value of or a change in a physical quantity. Sensors as described in the present application can be used to measure temperature, pressure (both absolute and differential), flow rate, seismic data, acoustic data, pH level, salinity levels, valve positions, or almost any other physical data.

In the first embodiment shown in FIG. 1, the piping structure comprises a production tubing string 34 for a well, which is typically steel tubing. The system has an electrical impeding device 146 located about the tubing 34 along a first end 41 near the surface. Device 146 may consist of an electrically insulating joint as shown in FIG. 1, or an unpowered choke of the present invention. A lower choke 32 is located about the tubing along a second end 42 downhole within the well. Surface equipment 38 comprises a power source to energize downhole equipment, and a computer-controlled modem to send and receive commands and data to downhole equipment. Power and communications signals are output from surface equipment 38 as time-varying currents and are electrically connected to the tubing 34 between the impeding devices 146, 32 using connectors 44 and 78. The time-varying current can be alternating current (AC) or a varying direct current (DC), but AC is typically more practical in use. AC power and communications signals from the source 38 are connected to the tubing 34 via an insulating feedthrough 76.

The device 40 comprises two terminals 51, 52. A device terminal is defined generally as an electrical connection point for a device, which may include but is not limited to: a wire, a device enclosure, a prong, a pin, a contact pad, a solder point, a female receptacle, a shaft, or any combination thereof. A first device terminal 51 is electrically connected to the tubing 34 downhole between the connection location for the source of current 38 and the lower choke 32.

A second device terminal 52 is also electrically connected to the tubing 34, but at a location on an opposite side of the lower choke 32 relative to the electrical connection location for the first device terminal 51. As described further below with equations, a voltage potential exists across the choke 32 when a time-varying current flows through the tubing. Hence, the device 40 is electrically connected across the voltage potential on the tubing developed by the choke 32 when AC flows in the tubing 34, which provides current flow through the device 40.

Device 146 may consist of an electrically insulating joint hanger, or a choke in accordance with the present invention. While electrically insulating joint hangers provide true electrical isolation, they must sustain significant mechanical loads on insulating materials such as plastics or ceramics, and are therefore subject to damage from those loads. Chokes cannot provide complete isolation, but are able to sustain high mechanical loads since they are constructed such that all the load-bearing elements are composed of metal.

At least a portion of the well casing 36 is electrically conductive. The electrically conductive portion of the well casing 36 is electrically connected to the tubing 34 (e.g., via conductive fluid 82 and/or packer 56) and the source of current 38. Hence, the electrically conductive portion of the well casing 36 acts as part of an electrical return to complete the electrical circuit.

Where centralizers are used to control the position of the tubing 34 relative to the casing 36, such centralizers which are disposed between devices 30 and 32 must not be electrically conductive. Suitable centralizers are typically composed of molded or machined plastic.

Therefore, the electrical circuit is formed by the system of the first embodiment, wherein the time-varying current (e.g., AC) can flow from the power source 38 to the tubing 34, along the tubing 34 between the device 146 and the choke 32, through the device 40 to the tubing 34 below the lower choke 32, to the casing 36 via the packer 56 and/or the conductive fluid 82, and along the well casing 36 to the source 38 to complete the electrical circuit. Thus, the downhole device 40 can receive power, as well as send/receive communication signals, using the tubing 34 between the upper and lower devices 146, 32 as one of the primary conductors and as a power and/or communications path.

In the application of the first embodiment shown in FIG. 1, the gas-lift oil well extends from the surface 64 through a borehole and extends into a production zone 66 downhole. A gas input throttle 74 is employed to permit the input of compressed gas into the tubing 34 via one or more motorized gas lift valves contained within pod 40 for lifting oil during production. The degree of opening of the gas lift valve in pod 40 may be controlled by means of setpoint commands sent by communication from the surface modem to the downhole modem and interpreted by a downhole control interface for a motor which opens and closes the gas lift valve. Sensor readings from the downhole pod may either be processed locally within the pod to provide autonomous control, or the sensor readings may be conveyed to the surface by means of the communications between the downhole and surface modems, for analysis at the surface.

The choke 32 is unpowered and made from a material having a high magnetic permeability (e.g., a relative permeability of 1000 to 150,000), such as a ferromagnetic metal alloy or a ferrite. The choke 32 is electrically insulated from the tubing 34 and acts to create a reactive impedance to AC flow in the tubing. In the case where the upper device 146 is a choke (rather than an electrically insulating joint), its action and construction is essentially the same as the lower choke 32. The choke 32 (and 146 in the case where it is a choke) are mounted concentric and external to the tubing 34 and are typically coated with shrink-wrap plastic to provide electrical insulation, and may additionally be enclosed within with an epoxy shell (not shown) to withstand rough handling and corrosive conditions. As described in the mathematical analysis below, the size and material of chokes can be chosen to achieve a desired series impedance value.

Figure 2:
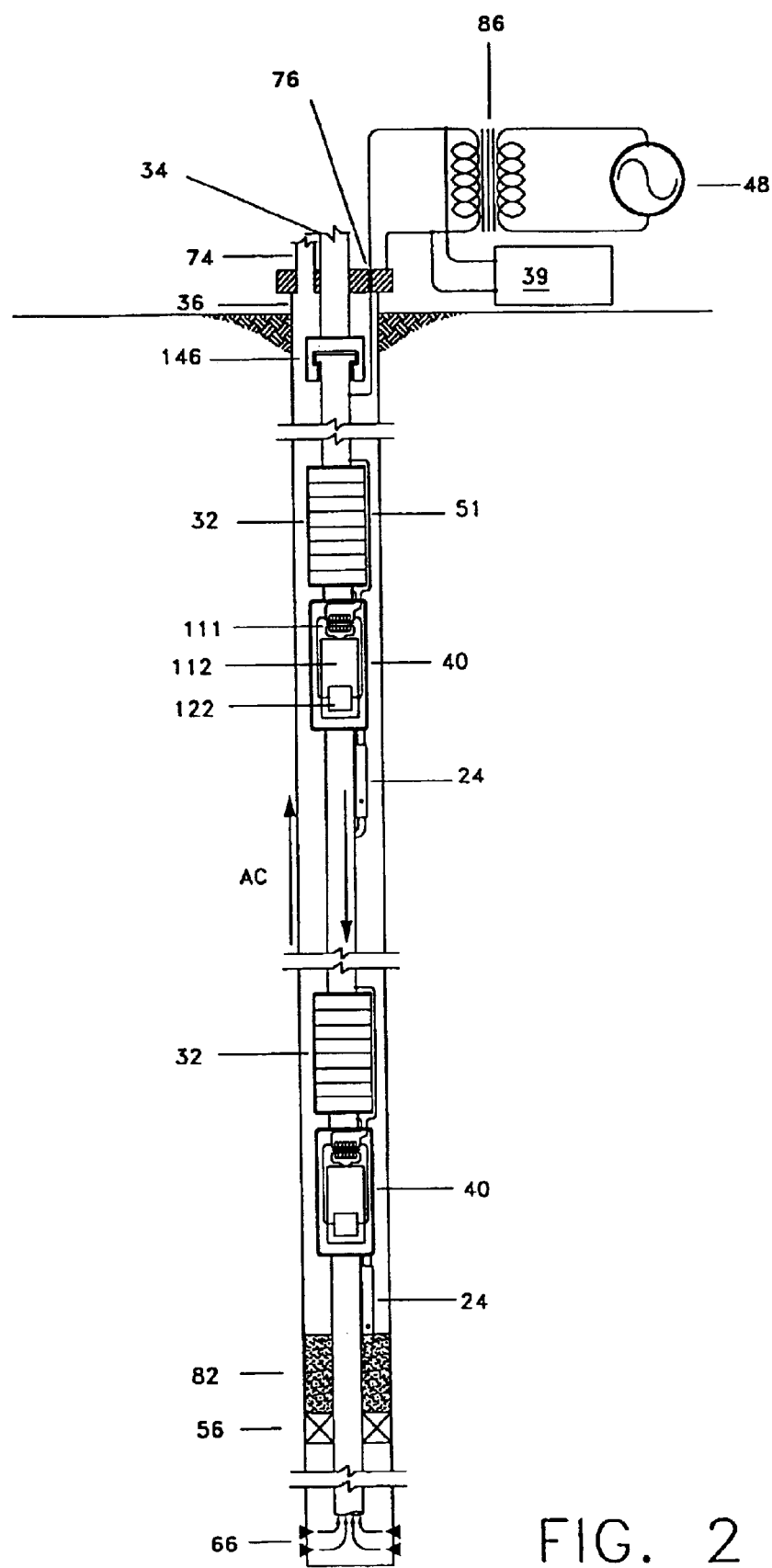
FIG. 2 is related to FIG. 1 and shows in more detail a petroleum well incorporating electrical chokes and associated communication, measurement and control equipment in accordance with the methods of the present invention.

FIG. 2 illustrates in greater detail the preferred embodiment of the invention outlined in FIG. 1 as it is applied to a gas-lift oil well. FIG. 2 illustrates such a well consisting of casing 36 extending from the surface and containing production tubing 34. At the well head the upper portion of the production tubing is electrically isolated from the lower portion by means of an electrically insulating joint 146. At depth within the well the annular space between casing 36 and tubing 34 contains completion fluid 82, and an electrically conductive packer 56 which hydraulically isolates the completion fluid from the production zone 66. Fluids from the production zone 66 are conveyed to the surface by passage through the production tubing 34. In FIG. 2 the disposition of two chokes 32 are shown at depth within the well, each of which is used to power electrical pods 40. These pods implement any combination of communication, measurement and control functions to assist well production operations.

Referring still to FIG. 2, the general disposition of surface equipment is illustrated, consisting of an AC power source 48, a 1:10 power transformer 86, and a modem 39. One output side of the surface power transformer and modem circuits are connected by means of conductor 44 through a pressure sealed electrical isolation feedthrough 76 to the production tubing section below the electrically isolating hanger. The other output sides of the power transformer and the surface master modem circuits are electrically connected to the well casing.

FIG. 2 shows each pod being used to power and control a motorized gas lift valve 24. For this purpose a suitable implementation of the pod consists of a power transformer ill with a winding ratio such that 2 Volts on the tubing side creates 15 Volts on the electronics module side (and vice versa), and a main printed circuit board (PCB) 112 having a modem 122 and other electrical components to power and control the motorized gas lift valve 24. The downhole modems within the pods communicate with the modem at the surface, and possibly with each other, allowing data to be transferred from each pod to the surface or between pods, and instructions to be passed from the surface to control each gas lift valve. Each modem is individually addressable, and each control or sensor device within each pod is individually addressable.

While FIG. 2 illustrates the case where two downhole modules are operated in the well, it will be readily apparent that the same principle may be used to provide an arbitrary number of downhole modules. This is useful in an application where a conductive completion fluid 82 is present in the annulus before unloading a gas-lift well. Each choke will not work sufficiently to develop a voltage potential at its respective device when the choke is submerged in conductive fluid, but as the conductive fluid is progressively removed during the unloading process, each device can receive power and/or communications (thus being controllable) when the respective choke is no longer submerged in conductive fluid. Hence, as the conductive fluid level drops during unloading, the devices sequentially become controllable, which aids in achieving a more controlled unloading procedure.

Figure 3:
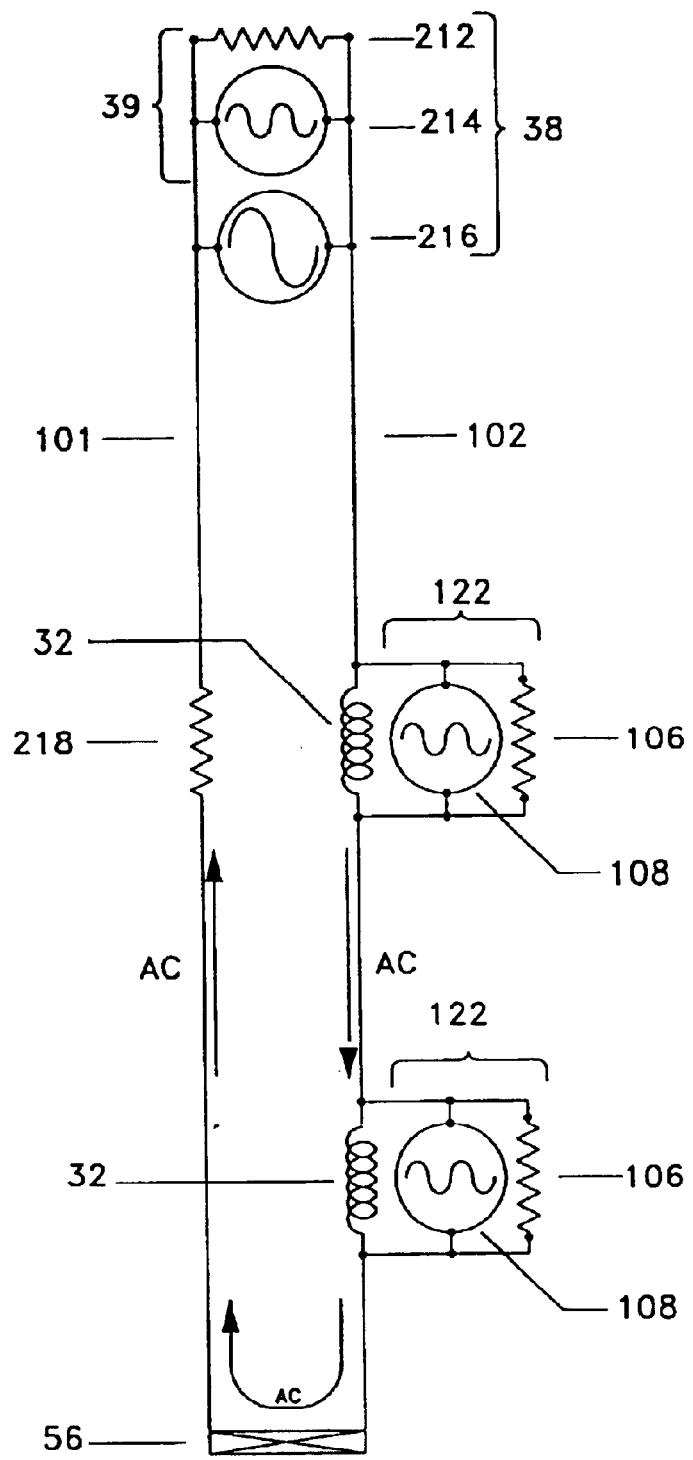
FIG. 3 is related to FIG. 2, and shows a simplified electrical equivalent circuit diagram of that well.

Referring to FIG. 3, the electrical equivalent circuit of the power and communications path of FIG. 2 may be analyzed. The casing and tubing form the major transmission paths for both the power and communication signals. The casing is represented by the conductor 101. The tubing is represented by conductor 102. Resistor 218 represents the combined distributed resistance offered by casing and tubing, and is typically of the order of 1 Ohm. The choke impedances are represented by inductors 32. At the frequency of the AC power the reactive impedance offered by each choke is of the order of 2 Ohms.

Referring still to FIG. 3, the surface master modem ensemble 39 is represented by resistor 212 for its receiver, and an AC source 214 for its transmitter. AC power input at the surface is represented by AC source 216. The downhole electronic pods associated with each choke are represented by power converter and modem ensembles 122, composed of resistors 106 for the power converters and modem receivers, and AC sources 108 for the modem transmitters. The circuit is completed by the metal packer 56 which has a negligibly small electrical impedance.

It is seen from FIGS. 2 and 3 that the downhole pods are powered by the AC voltage developed on the tubing by each choke, caused by the back-EMF created by the passage of current along the tubing which passes through the choke. The chokes are designed to develop about 2 Volts from the AC which passes through them, and this AC is converted to DC in the power conditioning circuit which is coupled through the power supply input transformer, following standard practice for such AC-to-DC power conversion and conditioning circuits. This DC power is typically supplied to the pod sensors, modem, and control circuits at about 15 Volts, and of the order of 10 Watts is typically available to power these downhole sub-systems.

Figure 4A:
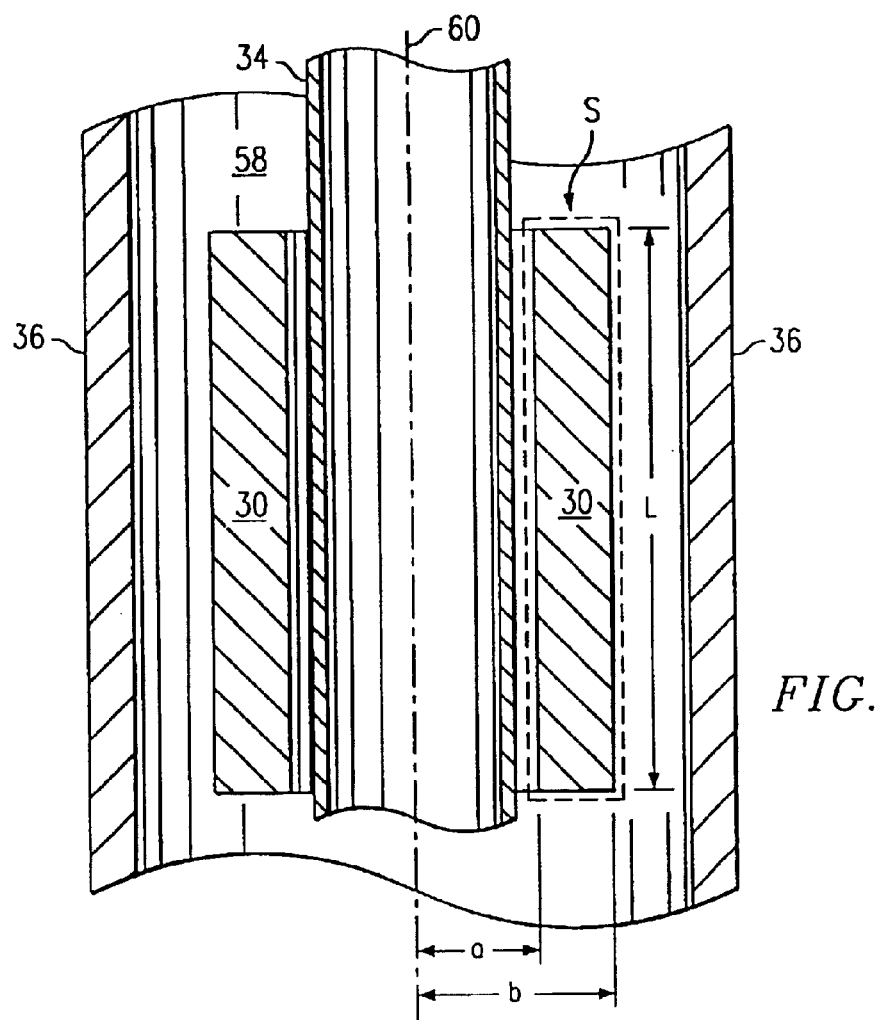
FIG. 4a is an axial cross-section of a choke showing variables used in the design analysis of a choke disposed between tubing and casing.
Figure 4B:
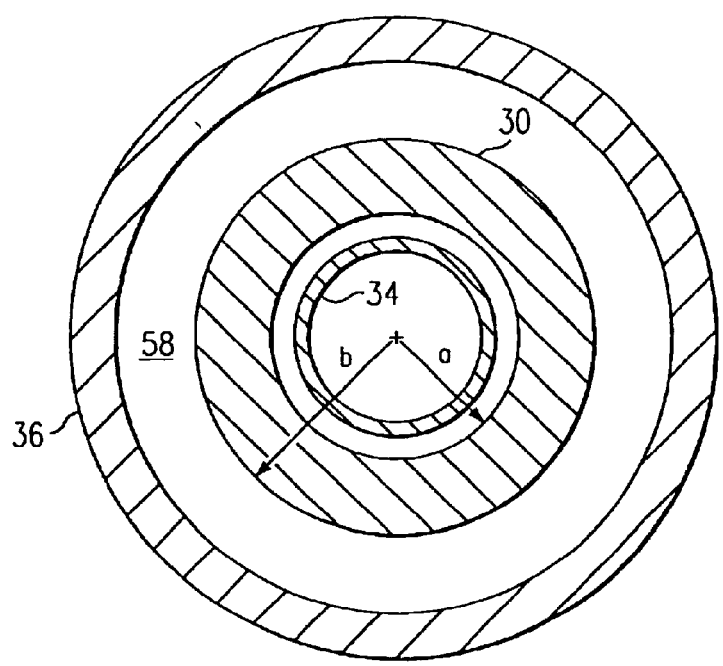
FIG. 4b is a radial cross-section of a choke showing variables used in the design analysis of a choke disposed between tubing and casing.
Figure 4C:
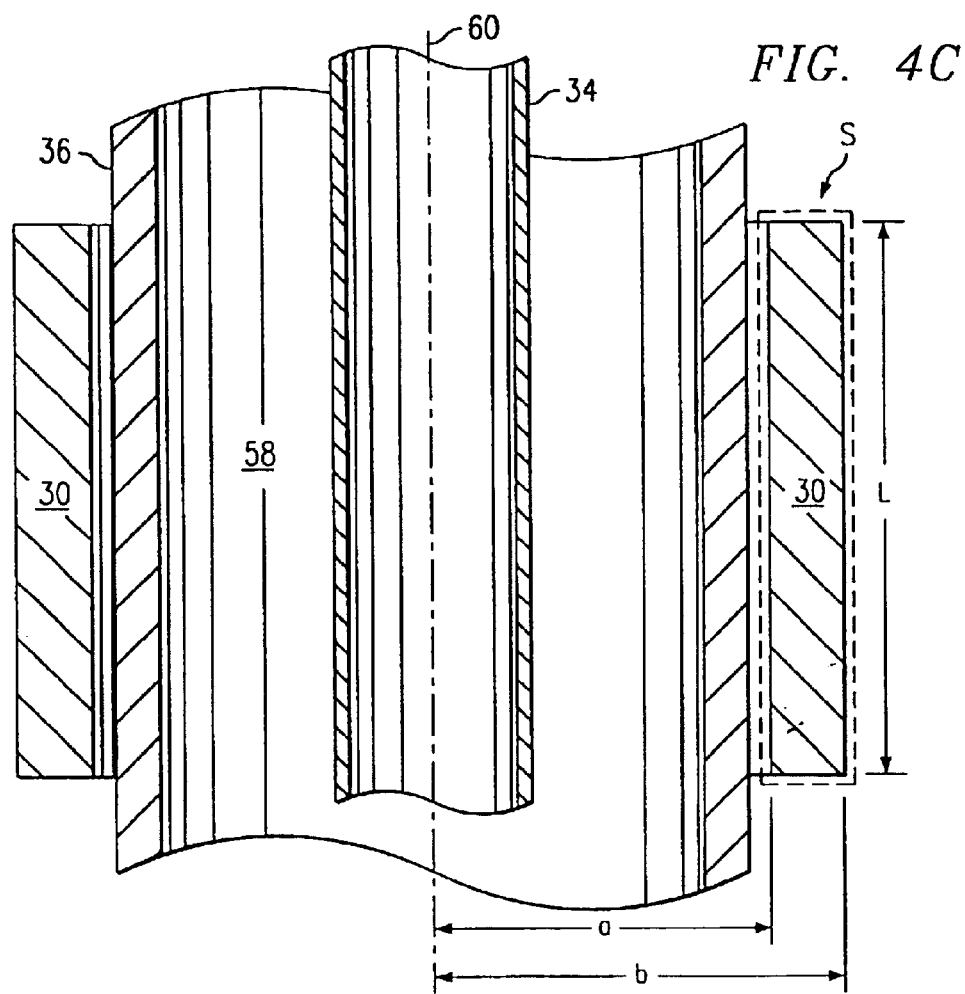
FIG. 4c is an axial cross-section of a choke showing variables used in the design analysis of a choke external to both tubing and casing.
Figure 4D:
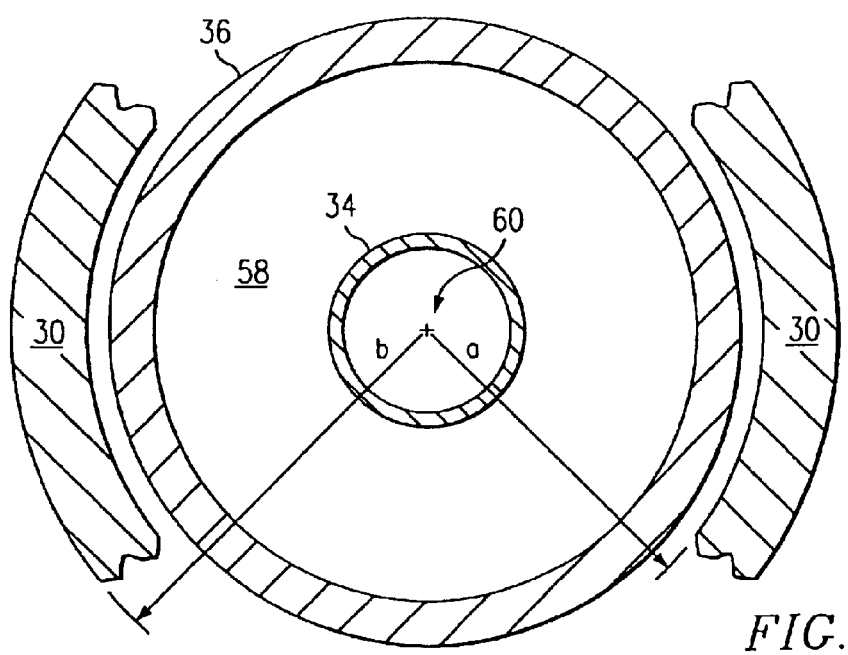
FIG. 4d is a radial cross-section of a choke showing variables used in the design analysis of a choke external to both tubing and casing.

FIGS. 4a–d indicate the parameters used in the choke design analysis. FIGS. 4a and 4b illustrate the case where the choke is placed within the annulus 58 between the tubing 34 and the casing 36. FIGS. 4c and 4d illustrate an alternative case where the choke is placed outside the casing 36. The basis for the analysis is the same in both cases, but it is important to realize that the electrical current value (I) used in the design analysis is the net current linked by the choke. In the case where the choke is disposed in the annulus 58 (FIGS. 4a and b), the current is that on the tubing alone. When the choke is disposed external to the casing (FIGS. 4c and d), the current is the vector sum of the separate currents on the casing and tubing. Thus if these currents were to be equal but opposite in phase there would be no net choking effect with the configuration shown in FIGS. 4c and 4d.

The defining variables and a self-consistent set of physical units are:

L=length of choke, meters;

a=choke inner radius, meters;

b=choke outer radius, meters;

r=distance from choke axis, meters;

I=r.m.s. net current through choked section, Amperes;

$\Omega$=angular frequency of leakage current, radians per second;

$\mu$=absolute magnetic permeability of choke material at radius r, equal to the absolute permeability of free space ($4\pi \times 10^{-7}$ Henrys per meter) multiplied by the relative permeability of the magnetic material of the choke.

By definition, $\Omega = 2\pi f$ where f=frequency in Hertz.

At a distance r from the current I, the r.m.s. free space magnetic field H, in Henries per meter, is given by:

$$H = I/2\pi r$$

The field H is circularly symmetric about the choke axis, and can be visualized as magnetic lines of force forming circles around that axis.

For a point within the choke material, the r.m.s. magnetic field B, in Teslas, is given by:

$$B = \mu H = \mu I/2\pi r$$

The r.m.s. magnetic flux F contained within the choke body, in Webers, is given by:

$$F = \int B dS$$

where S is the cross-sectional area of the choke in square meters as shown in FIGS. 5a and 5c and the integration is over the area S. Performing the integration from the inner radius of the choke (a), to the outer radius of the choke (b), over the length of the choke (L), we obtain:

$$F = \mu L I \ln(b/a)/2\pi$$

where ln is the natural logarithm function.

The voltage generated by the flux F, in Volts, is given by:

$$V = \Omega F = 2\pi f F = \mu L I f \ln(b/a)$$

Note that the back-e.m.f. (V) is directly proportional to the length (L) of the choke for constant values of (a) and (b), the choke element internal and external radii. Thus by altering the length of the choke, any desired back-e.m.f. can be generated for a given current.

Inserting representative values:

$\mu = 50,000 \times (4\pi \times 10^{-7})$, L=1 meter, I=10 Amperes, f=60 Hertz, a=0.045 meters (3.6 inch inner diameter), b=0.068 meters (5.45 inch external diameter):

then the back-e.m.f. developed V=2.6 Volts showing that such a choke is effective in developing the required downhole voltage, and does so when realistic and safe currents and voltages are impressed upon the tubing and transmitted from the well head to downhole equipment.

As a design choice, chokes are manufactured of material having a high magnetic permeability at the frequencies of the AC power and communications sources and receivers. Appropriate design of the chokes is required to provide adequate AC isolation over the section of piping structure between them, which is used as the transmission path for power and communication.

The power can be transmitted at a certain frequency range within a functional bandwidth, and the communications can be transmitted at another frequency range within the same functional bandwidth. Because the frequency of the AC power is generally lower than that of the communications bandwidth provided, the AC power frequency will often determine the lower bound of the frequency range over which electrical isolation is required. Because the electrical impedance of a choke rises linearly with frequency, if the choke provides adequate impedance at the AC power frequency, typically it will also be adequate at the higher frequencies used for communication. However, ferromagnetic materials are characterized by a maximum operating frequency above which ferromagnetic properties are not exhibited. Thus the upper frequency bound of the ferromagnetic material chosen for the choke construction must be adequate to provide isolation at the upper bound of the communication band.

Ferromagnetic materials also are characterized by a saturation flux density, the maximum magnetic flux that can be sustained. For the geometry and application described here, where the current is not expected to be greater than a few Amperes, the flux densities will not approach this value and so this is not likely to be a limiting consideration. However, if higher currents are required, this limitation will become part of the design process.

At power frequencies up to a few hundred Hertz, suitable chokes may be constructed of Permalloy (Permalloy is a registered Trademark, of Western Electric Company). Permalloy is a nickel/iron alloy with a nickel content in the range 35% to 90% and is available as a commodity material from many commercial sources. A suitable alloy for this application is composed of 86% nickel/14% iron. As in standard transformer design practice, lamination is required to reduce induced eddy current effects which would otherwise degrade the effectiveness of the choke. For material with absolute magnetic permeability of 50,000 Henries/m operating at 60 Hertz the required lamination thickness for 2 skin depths would be about 0.8-millimeters, which would be practical. Skin depth/decreases linearly with frequency, so that at communication frequencies the minimum thickness of the laminations can be smaller.

In alternative implementations, chokes may be made of ferrites, which are ferromagnetic materials which are electrically non-conductive and thus do not exhibit eddy-current effects. Each ferrite composition has a characteristic upper frequency above which it ceases to behave as a ferromagnetic material, and thus a specific ferrite composition selected for a choke must exhibit ferromagnetic properties up to at least the upper bound of the communication band needed. A suitable ferrite composition is the manganese-zinc Material W used to make toroidal cores available from Amidon Inductive Components Inc., Costa Mesa, Calif. For testing purposes, a suitable component is Amidon product FT240W, with a relative permeability of 10,000, a maximum flux density of 4300 Gauss, and an application frequency range up to 1 MHertz. In practice the choice of choke material is made on the grounds of economy, availability of materials, ease of manufacture, and ease of handling and installation.

The geometry of a choke, including its protective encapsulation, is also a design consideration. For example in a gas-lift oil production application, there must be an adequate amount of ferromagnetic material to provide sufficient impedance by induction (as described above), but fluid flow through the annulus between the production tubing and casing must be adequate for the expulsion of liquids during kick-off, and for the flow of gas during production. For this reason, the choke geometry is chosen to occupy only a fraction of the cross-sectional area of the annulus. Hence, the free variable in the choke geometry in such an application is its length/ which is chosen to provide an adequate volume of ferromagnetic material and thus develop the desired degree of electrical isolation.

A choke for a given application may be divided into multiple pieces along its length (L). In other words, stacking multiple chokes together along the choke axis 60 provides essentially the same effect as have one large choke (longer in length (L)). Multiple chokes 30 stacked on top of one another will act as a series of impedances, which can be added together to provide essentially same total impedance as a single, longer choke having the same total length of ferromagnetic material. Stackable modular chokes can be selected and/or combined as needed for a given piping structure size, or for a given current size or frequency. Also, stackable modular chokes may be used for tuning a system by changing, adding, or removing chokes.

The cross-sectional geometry of a choke 30 (e.g., area S in FIG. 3A) may vary for a given application. More important than the cross-section geometry is the generally cylindrical or toroidal shape of the choke. A complete loop or ring configuration, as opposed to a C-shaped choke, is most desirable because it allows the magnetic flux to flow more uniformly about the choke axis 60 and significantly increases the effectiveness of the choke's ability to produce a back-e.m.f. to impede the current flow through the choke 30. Hence, the cross-sectional geometry of a choke can have a variety of shapes, including but not limited to: square, round (as shown n FIGS. 4b and d), elliptical, triangular, regular polygonal, irregular polygonal, arbitrarily shaped, or any combination thereof. Also, the cross-sectional geometry of a choke need not be uniform about the choke axis 60, but cross-sectional uniformity about the choke axis is often preferable. Also, the inner radius (a) and/or outer radius (b) (see FIGS. 4b and 4d) need not remain constant about the choke axis 60 for a given location along the choke axis, but having a constant inner radius (a) and outer radius (b) about the choke axis 60 (as shown in FIGS. 4b and 4d) is likely to be easier to make and is often preferable.

The ferromagnetic component of a choke should be protected from environmental damage during both installation and operation. During installation an important consideration is mechanical damage caused by handling as the chokes are placed on the tubing, and while the tubing sections are set in place in the borehole, which could cause abrasive damage as the choke travels through the well casing. Once in service, an important consideration is corrosion caused by chemical reactions between the well fluids and the ferromagnetic materials at the temperatures and pressures of the well. While the well may be expected to be an oxygen-free and therefore chemically reducing environment caused by the presence of hydrocarbons, the possible presence of hydrogen sulfide and brine can also create conditions that are corrosive. For these reasons, the choke components can be encapsulated to protect against mechanical damage, abrasion, and penetration of well fluids by using organic polymers such as shrink-wrap plastic and/or fiber-reinforced epoxy, to increase resistance to abrasion, mechanical stress, and shock. Note that whatever the choice of specific materials for the encapsulation, these may need to be electrically non-conductive to preserve the isolation effect of the choke. Also, encapsulating a choke in an electrically non-conductive material can prevent the choke from shorting to the well casing when the well casing is electrically conductive.

Figure 5:
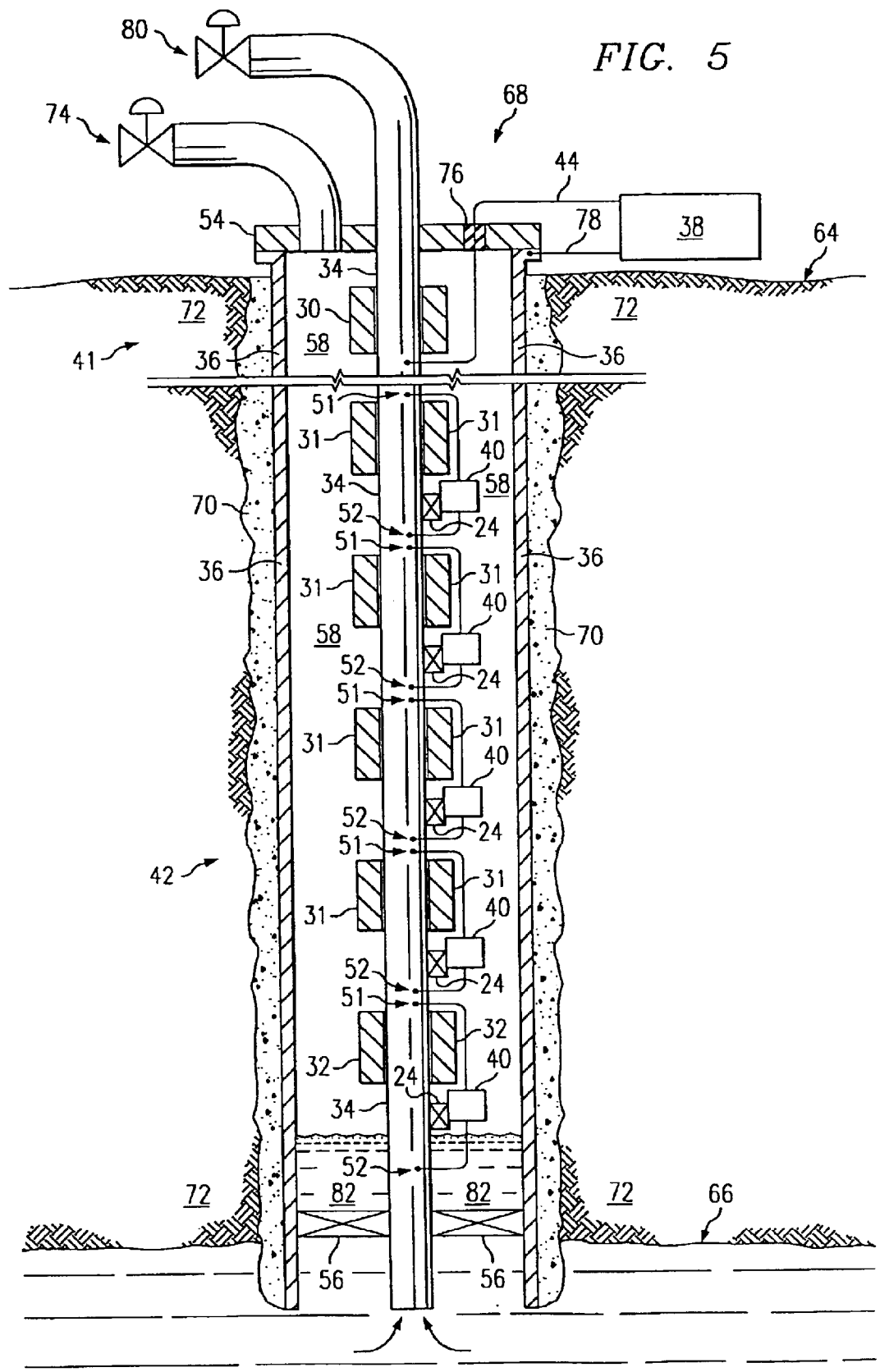
FIG. 5 is a schematic showing a possible application of the first embodiment of FIG. 1.

As illustrated in FIG. 5, multiple downhole modules may be placed in a well. As described in reference to FIGS. 1 and 2, the uppermost AC restricting device may be either an isolating joint or an induction choke, and in the embodiment shown in FIG. 5 device 30 is a choke as described in reference to choke 32 of FIGS. 1 and 2, and is structurally and functionally similar to this device.

Referring still to FIG. 5, controllable gas-lift valves 24 are coupled to or operably connected to the tubing 34 to control the gas injection from the annulus 58 (between the tubing 34 and the casing 36) to the interior of the tubing. Each valve 24 is controlled by its associated electronics pod 40, and may be a component within pod 40. Each device 40 is independently powered. Each device 40 includes an individually addressable modem for receiving and sending communication signals and/or data via the tubing 34. Each device 40 may also include other mechanical devices that can be controlled by instructions received by the device via the tubing 34. Communication signals are sent from and received by the surface computer 38 using the tubing 34 and casing 36 as conductors. Each device 40 may also include sensors to measure well conditions, such as temperature, pressure, flow rates, or acoustic waveforms.

The ability to actively monitor immediate conditions downhole, coupled with the ability to control surface and downhole conditions, provides many advantages in a gas-lift well, such as the ability to detect, attain and maintain a particular lift flow regime In the embodiment shown in FIG. 5, all of the gas-lift valves 24 of the devices 40 are independently controllable. It is desirable to lift the oil column from a point in the borehole as close as possible to the production packer 56. That is, the lowest gas-lift valve is the primary valve in production. The upper gas-lift valves are used for unloading or kick-off of the well during production initiation. In conventional gas-lift wells, the upper valves have bellows pre-set with a 200 psi margin of error to ensure the valves close after set off. Further, such conventional valves often leak and fail to fully close. Hence, lift pressure is typically lost downhole due to pressure losses at each valve. Use of controllable valves can overcome such shortcomings. Thus, providing communication signals carrying control commands is essential to controlling such valves, and the present invention provides numerous ways to communicate with and control downhole devices 40 via the tubing 34 and/or casing 36.

Construction of a controllable gas-lift well that incorporates the present invention can be similar to conventional construction methodology because many of the conventional components of a gas-lift well can still be used. For example, after casing the well, a packer 56 is typically set above the production zone 66. The tubing string 34 is then fed through the casing 36 into communication with the production zone 66. As the tubing string 34 is made up at the surface 64, a lower induction choke 32 is placed around one of the conventional tubing strings 34 for positioning above the downhole packer 56. In the sections of the tubing strings where it is desired, a downhole device 40 (e.g., comprising a controllable gas-lift valve, spread spectrum communication device, and sensors) are coupled to the tubing 34. Alternatively, a prefabricated joint already prepared with chokes 31 or 32, and pod 40, and their associated wiring may be used to facilitate field operations Other downhole devices 40 comprising a spread spectrum communication device can be placed along the tubing 34 at various places to achieve communications redundancy. In one form, a side pocket mandrel for receiving a slickline insertable and retractable downhole device can be used. With such configuration, either a controllable gas-lift valve can be inserted in the side pocket mandrel and/or one or more sensors can be used within the mandrel. Alternatively, the downhole device 40 may be tubing conveyed. The tubing string 34 is made up to the surface 64 where an upper induction choke 30 is placed around the tubing string 34 below the tubing hanger 54. Communication and power leads 44 are then connected through the wellhead pressure seal 76 to the tubing 34 below the upper choke 30.

In other types of wells (e.g., rod pumping), only a sensor and communication device may be needed within a downhole device 40, without the necessity of including a controllable gas-lift valve. For example, a downhole device 40 having pressure, temperature, or acoustic sensors or other sensors, power supply, and a communication device may be inserted into a side pocket mandrel for communication with the surface computer 38 to determine flow regimes using the tubing 34 and casing 36 as electrical communication conductors. Alternatively, such electronics modules may be mounted directly on the tubing 34 (tubing conveyed) and not be configured to be wireline replaceable. If directly mounted to the tubing 34, a device 40 may only be replaced by pulling the entire tubing string. With only sensors placed downhole, measurements can be communicated to the surface and surface parameters (e.g. compressed gas input) can be regulated to obtain a desirable downhole flow regime.

Figure 6:
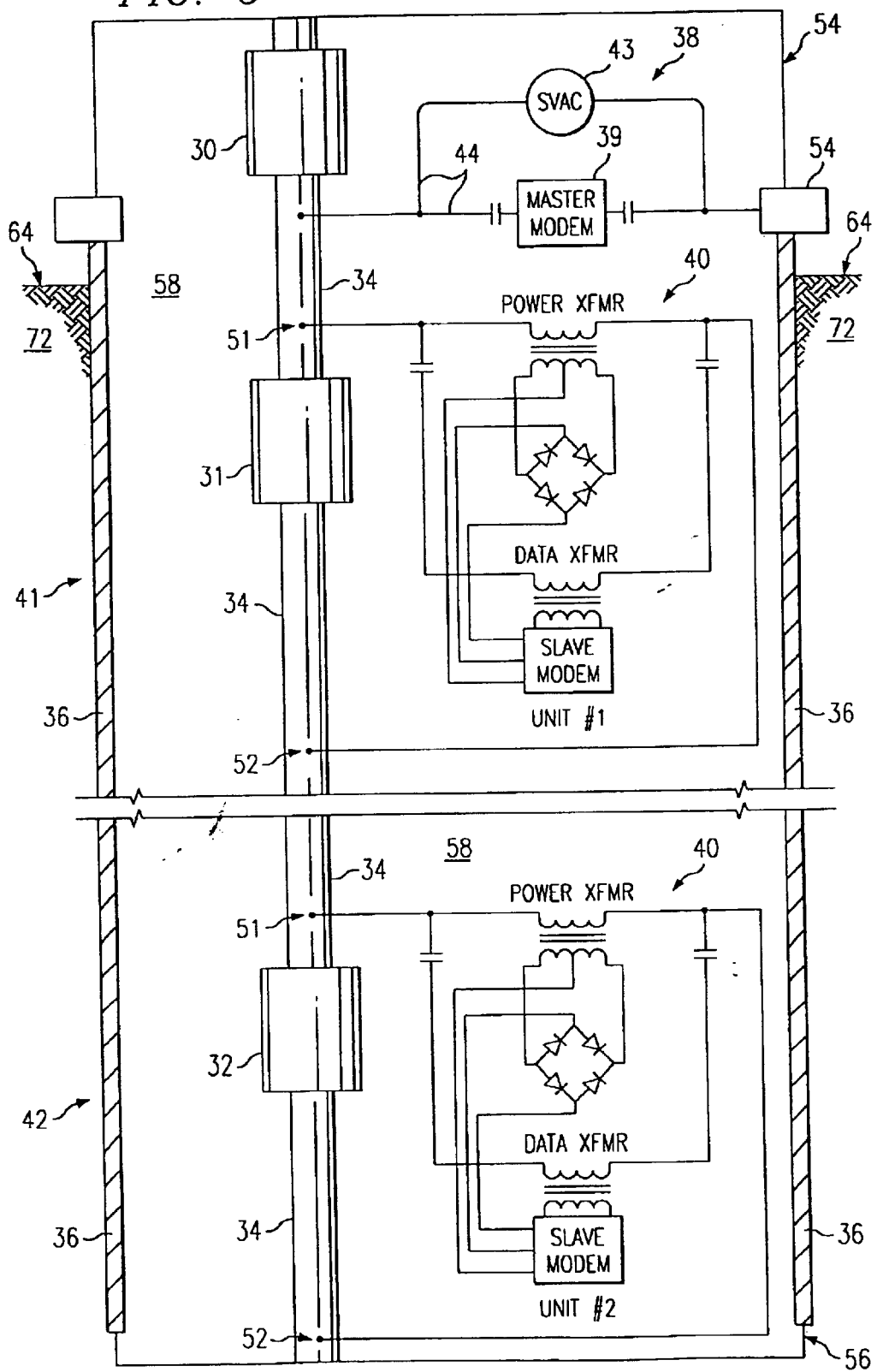
FIG. 6 is a schematic diagram depicting the surface computer in communication with the electronics of the controllable gas-lift valve.

FIG. 6 illustrates in more detail the means for combining, distributing, and separating the power and communications signals within a well, using the methods of the present invention and as depicted in FIG. 5. Surface equipment 38 comprises an AC power source 43 directly coupled to the well tubing and casing, and a modem 39 capacitively coupled to tubing and casing, with the capacitor values chosen to effectively couple the communication frequencies, but to decouple the modem at the lower power frequencies. Each downhole ensemble 40 comprises a power coupling transformer connected to tubing 34 above and below choke 31 or 32 by connectors 51, 52. The output from this transformer passes to a diode bridge rectifier which provides DC power to the electronics components of downhole ensemble 40, which includes a modem as shown. Connectors 51, 52 also provide connection for bidirectional communications signals, which are capacitively coupled through a data transformer to the modem of each downhole module. Again, the coupling capacitor values are values chosen to effectively couple the communication frequencies, but to decouple the modem at the lower power frequencies.

Figure 7:
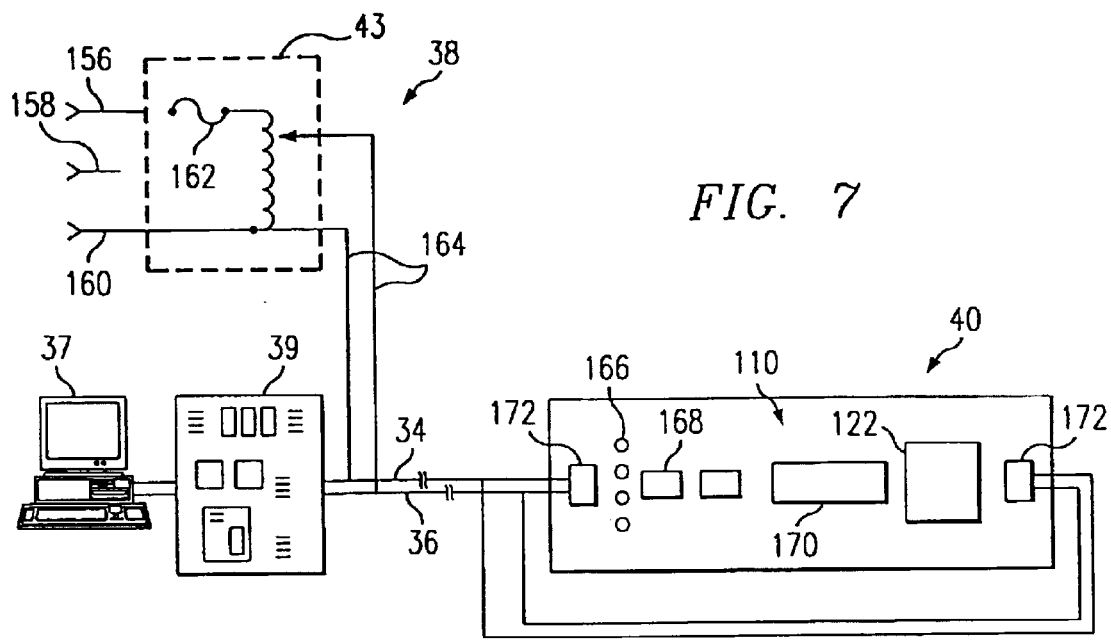
FIG. 7 is a system block diagram of the surface electronics power and control system of FIG. 6.

FIG. 7 is a block diagram illustrating in more detail the surface power and communication equipment 38 of FIGS. 1, 5 and 6. The source 38 of power and communications can broadly include, for example, a master modem 39 and an AC power source 43. A computer 37 is shown coupled to the master modem 39, such as via an RS232 bus, with the computer running a multitasking operating system, such as Microsoft Windows NT, and a variety of user applications. The AC power source 43 includes a 120 volt AC input 156, ground 158, and neutral 160. A fuse 162 (e.g., 7.5 amp) with transformer output 164 at approximately 6 volts AC and 60 Hz is shown. The power source 43 and master modem 39 are electrically connected to the casing 36 and tubing 34 as schematically depicted in FIG. 6. The electronics control module 110 includes a power supply 166 and an analog-to-digital conversion module 168. A programmable interface controller 170 is shown coupled to the slave modem 122. I/O decouplings 172 are also provided.

Figure 8:
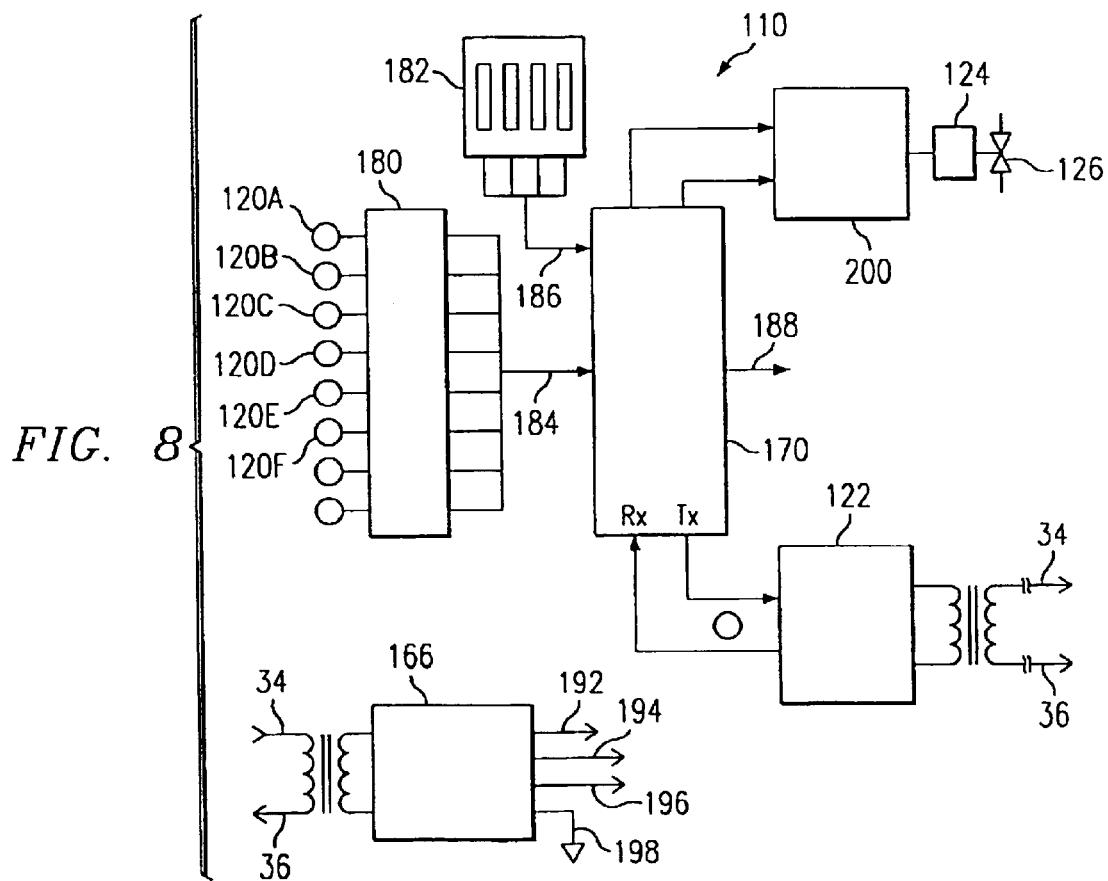
FIG. 8 is a system block diagram of the downhole electronics power and control system of FIG. 6.

FIG. 8 expands on the depiction in FIG. 7 and shows in detail the components of the downhole devices 40 of FIGS. 1, 5 and 6 and 7. Amplifiers and signal conditioners 180 are provided for receiving inputs from a variety of individual sensors 120 (such as acoustic signature, tubing temperature, annulus temperature, tubing pressure, annulus pressure, lift gas flow rate, valve position, salinity, differential pressure, etc.). Low noise operational amplifiers 180 are configured with non-inverting single ended inputs (e.g., Linear Technology LT1369). The amplifiers 180 are all programmed with gain elements designed to convert the operating range of each individual sensor input to a meaningful analog output. The programmable interface controller 170, using standard analog to digital conversion techniques generates an 8 bit digital signal equal to an amplifier's output.

In more detail, pressure sensors (such as produced by Measurement Specialties, Inc.) are used to measure the pressure in the tubing, internal pod housing, and differentially across a gas-lift valve (e.g., as shown in FIG. 5 at 120D and 120E). In commercial operation, the internal pod pressure is considered unnecessary, but is often available as an option. Such pressure sensors 120D, 120E are potted to withstand the severe vibrations often associated with gas-lift tubing strings. A temperature sensor 120B (such as Analog Devices, Inc. of Norristown, Pa., product LM-34) is used to measure the temperature in the tubing and operationally in a diagnostic mode in the housing pod, power transformer, or power supply. The temperature transducers are rated for −50 to 300° F. and are conditioned by input circuitry 180 to +5 to 255° F.

Address switches 182 are provided to address a particular device from the master modem 39. As shown in FIG. 7, 4 address bits are switch selectable to form the upper 4 bits of a full 8 bit address. The lower 4 bits are implied and are used to address the individual elements within each downhole device 40. Thus, using this illustrated configuration, 1024 devices or modules can be assigned to a single master modem 39 (FIG. 6) on a single communications line. As configured, up to 4 master modems 39 can be accommodated on a single communications line.

The programmable interface controller 170 of FIG. 8 (e.g., PIC 16C77 as manufactured by Microchip of Chandler Ariz.)) has a basic clock speed of 20 MHz and is configured with 8 analog-to-digital inputs as shown at connection 184 and 4 address inputs as shown at connection 186. The programmable interface controller 170 includes a TTL level serial comminations UART 188, as well as a stepper motor controller interface 190. The power supply 166 of FIG. 8 converts a nominal 6 volts AC line power to plus 5 volts DC at output 192, minus 5 volts DC at output 194, and plus 6 volts DC at output 196, which are used by various elements within the electronics control module 110 (ground is depicted at terminal 198). The programmable interface controller 170 uses the plus 5 volts DC, while the slave modem 122 uses the plus 5 and minus 5 volts DC (as provided at outputs 192 and 194). The stepper motor 124 uses the plus 6 volts DC (as provided at output 196). The power supply 166 comprises a step-up transformer for converting the nominal 6 volts AC to 7.5 volts AC. The 7.5 volts AC is then rectified in a full wave bridge to produce 9.7 volts unregulated DC. Three-terminal regulators provide the regulated outputs 192-196, which are heavily filtered and protected by reverse EMF circuitry. The modem 122 is typically the major power consumer, e.g., using 350+ milliamps at plus/minus 5 volts DC when transmitting.

In more detail, the digital spread spectrum modem 122 consists of an IC/SS power line carrier chip set (such as brand EG ICS1001, ICS1002 and ICS1003 from National Semiconductor) and is capable of 300–3200 baud data rates at carrier frequencies ranging from 14 kHz to 76 kHz (U.S. Pat. No. 5,488,593 describes the chips set in more detail and is incorporated herein by reference).

The programmable interface controller 170 controls the operation of the stepper motor 124 through a stepper motor controller 200 (such as Motorola SA1042 stepper motor driver circuit). The controller 200 needs only directional information and simple clock pulses from programmable interface controller 170 to drive the stepper motor 124. A single "set" of the controller 200 at initialization conditions all elements for initial operation in known states. The stepper motor 124 positions a cage valve stem toward or away from its seat as the principal operative component of the controllable gas-lift valve 126. The stepper motor 124 provides 0.4 inch-ounces of torque and rotates up to 500 pulses per second (for emergency close time). A complete revolution of the stepper motor 124 consists of 24 individual steps. The output of the stepper motor 124 is directly coupled to a 989:1 gear head (such as a MicroMo gear head), which produces the necessary torque to open and close the cage valve 126. The continuous rotational torque required to open and close the cage valve 126 is 3 inch-pounds with 15 inch-pounds required to seat and unseat the cage valve, and these torque requirements are met by the embodiment as described. Other motor types may be readily substituted for the stepper motor embodiment described, for instance DC positioning servomotors.

The programmable interface controller 170 communicates through the digital spread spectrum modem 122 to the proximate modems in the source 38 or other devices 40 via the modem coupling network formed by the tubing 34, chokes 30, 32, and casing 36. The programmable interface controller 170 uses the MODBUS 584/985 PLC protocol. The protocol is ASCII encoded for transmission.

Depending on the communication range that the downhole modems 122 are capable of providing under specific well conditions, the transmission of sensor and control data up and down the well may require that these signals be relayed between modems 122 rather than passed directly from the surface to the selected downhole devices 40. This relay method can be applied to both conventional and multilateral well completions.

Preferably the modems 122 are placed so that each can communicate with the next two slave modems up the well and the next two slave modems down the well. This redundancy allows communications to remain operational even in the event of the failure of one of the slave modems 122.

The ensemble of downhole devices 40 having modems 122 can provide a permanent telemetry backbone that can be part of the infrastructure of the well. Such a telemetry backbone may provide a means to measure the conditions in each part of the well and transmit the data to a surface computer via the master modem 39, and for the computer to transmit control signals to open or close downhole valves to set back pressure, set gas injection rate, adjust flow rates, and so on. This level of control allows production from the well to be optimized against criteria that may be dynamically managed in substantially real-time, rather than being fixed by a static production goal. For instance, the optimum under one set of economic conditions may be maximum recovery from the reservoir, but under different economic conditions it may be beneficial to alter the production method to minimize the cost of recovery by using lift gas to maximum effect.

The number, type, and disposition of downhole devices 40 used depends on the requirements of the individual well application. The system preferably includes more modems 122 than necessary to provide redundancy in case of failure of one of the downhole modems.

Preferably, pressure measurements are taken at locations uninfluenced by gas-lift injection turbulence. Acoustic sensors (e.g., sound waves less than about 20 kilohertz) can listen for tubing bubble patterns. Sensor data can be sent via a modem 122 to at least the two nearest downhole modems 122 and thus relayed to the master modem 39. The surface computer (either local or centrally located) can continuously combine and analyze the downhole data as well as surface data, to compute a real-time tubing pressure profile. An optimal gas-lift flow rate for each controllable gas-lift valve then may be computed from the sensor data.

Figure 9:
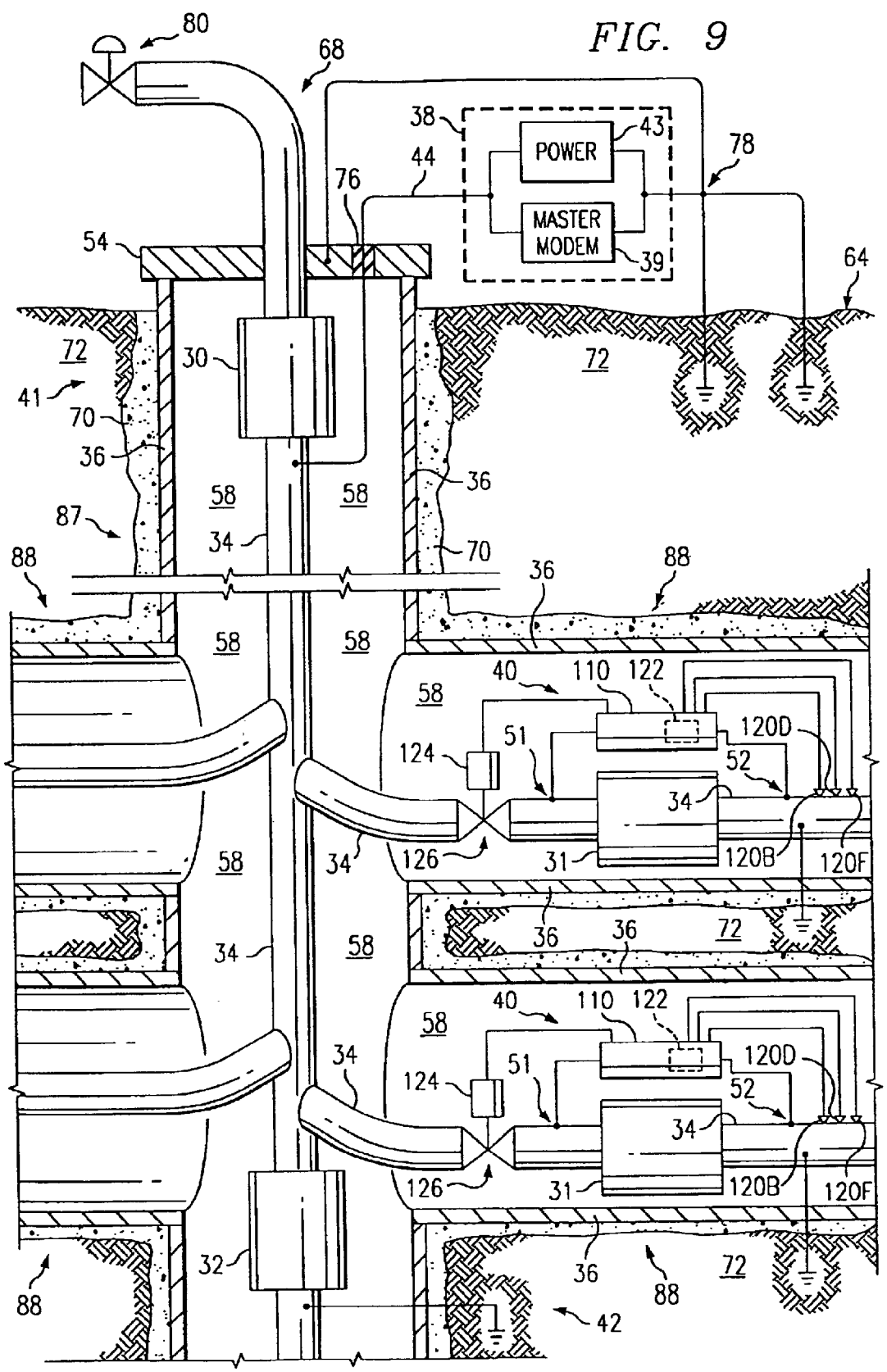
FIG. 9 is a schematic of a multilateral controllable petroleum well in accordance with the methods of the present invention.

Other types of configurations are contemplated. For example, FIG. 9 shows a multilateral petroleum well application of a third embodiment in accordance with the present invention. In a multilateral completion shown in FIG. 9, the tubing 34 is used as a conductor for power and communication signals, and the earthen ground is used as an electrical return. A controllable valve 126, a downhole spread spectrum modem 122, and sensors 120 are placed in each lateral. The main borehole 87 branches into four laterals 88. The source 38 comprises a computer system having an AC power supply 43 and a master modem 39. As long as a time-varying current is output to the electrical circuit, the source 38 may comprise any variety of electronic components, including but not limited to: a computer system, a modem, a power supply, a software program for analyzing data, a software program for controlling downhole devices, or any combination thereof. Redundant relay modems (not shown) can be included along the tubing 34 in the main borehole 87 for communicating between the master modem 39, downhole modems 122, and other relay modems.

The computer system 38 is electrically connected at a first location 41 of the main borehole 87 between an upper choke 30 and a lower choke 32. The lower choke 32 is located at a second location 42 of the main borehole 87. The lower choke 32 routes the time-varying current flowing in the tubing 34 of the main borehole 87 into the tubing 34 in the branches 88. An additional choke 31 is located within each lateral branch 88 (details of only two branches shown). Current is directed through a downhole device 40 and across the voltage potential formed at each choke 31 within each lateral branch 88. As shown in FIG. 9, the tubing 34 is electrically connected to the earthen ground 72 at various places to complete the circuit stemming from each choke (30, 31, 32).

Each downhole device 40 comprises a electronics control module 110, sensors 120, a downhole spread spectrum modem 122, an electric motor 124, and an electrically controllable valve 126. The electronics control module 110 receives power and communications from the tubing 34, which it uses to provide power, control, and communications for the sensors 120, downhole modem 122, and electric motor 124. The electronics control module 110 can contain various logic structures for closed loop control of the valve 126 based on measurements taken by the sensors 120. In this example, there is a pressure sensor 120D, a temperature sensor 120B, and a flow sensor 120F. However, other types of sensors 120 can also be used or substituted (e.g., acoustic sensor, chemical composition sensor). The downhole modem 122 in the device 40 can send data from the sensors 120 to the computer system 38 at the surface 64. Also, the downhole modem 122 can receive control signals from the computer system 38 via the master modem 39. The electronics control module 110 provides power and control for the electric motor 124, which is capable of operating with low current. The electric motor 124 is used to open, close, or adjust the valve 126. Each electronics control module 110 for each lateral branch 88 can be separately addressable, each sensor 120 can be separately monitored, and each valve 126 can be independently operated. Hence, using a communication system in accordance with the third embodiment, each valve 126 in each lateral branch 88 can be electrically controlled to manage the fluid flow across each branch using an array of spread spectrum modems 39, 122 (relay modems not shown in FIG. 9) communicating via the tubing 34.

In such a multilateral configuration as shown in FIG. 9, it is highly desirable and sometimes necessary to control-fluid flow in each lateral branch 88. Knowledge of the flow rate and characteristics (e.g., fluid make-up, pressure, temperature) obtained from the sensors 120, as well as controllability of each valve 126, can be used to optimize production efficiency. Such optimized production efficiency can translate into production cost savings and/or increased production rate. Also in some cases, the ability to control and monitor multiple branches or sections of a well may be the only way to produce from all production zones of a multi-zone well or it may be the only way to obtain cost effective production from a multizone well. The number and types of valves, modems, sensors, and induction chokes needed depends on, among other things, the well design, depth, and operating conditions.

Using the downhole and surface conditions, the operating parameters of the well or individual laterals may be controlled, such as flow rate, back pressure, gas injected, surfactant used, etc. For example, in addition to controlling the flow rate of the well, production may be controlled to operate in or near Taylor fluid flow state. Unwanted conditions like "heading" and "slug flow" can be avoided. By changing well operating conditions, it may be possible to attain and maintain Taylor flow, which is often the most desirable flow regime. By being able to determine unwanted bubble flow conditions quickly downhole, production can be controlled to avoid such unwanted conditions. That is, a fast detection of such conditions and a fast response by the surface computer can adjust such factors as the position of a controllable gas-lift valve, the gas injection rate, back pressure on tubing at the wellhead, and even injection of surfactant.

The placement of an induction choke or chokes, as well as the number of chokes, can vary to provide many possible embodiments of the present invention, which is further illustrated by some possible embodiments and briefly described below. However, there may be more possible embodiments possible, such as by combining various elements of the following described embodiments or by adding more components or complexity to an embodiment of the present invention. The embodiments are shown herein in simplified form to focus on illustrating the variations of the elements forming different embodiments of the present invention.

Figure 10:
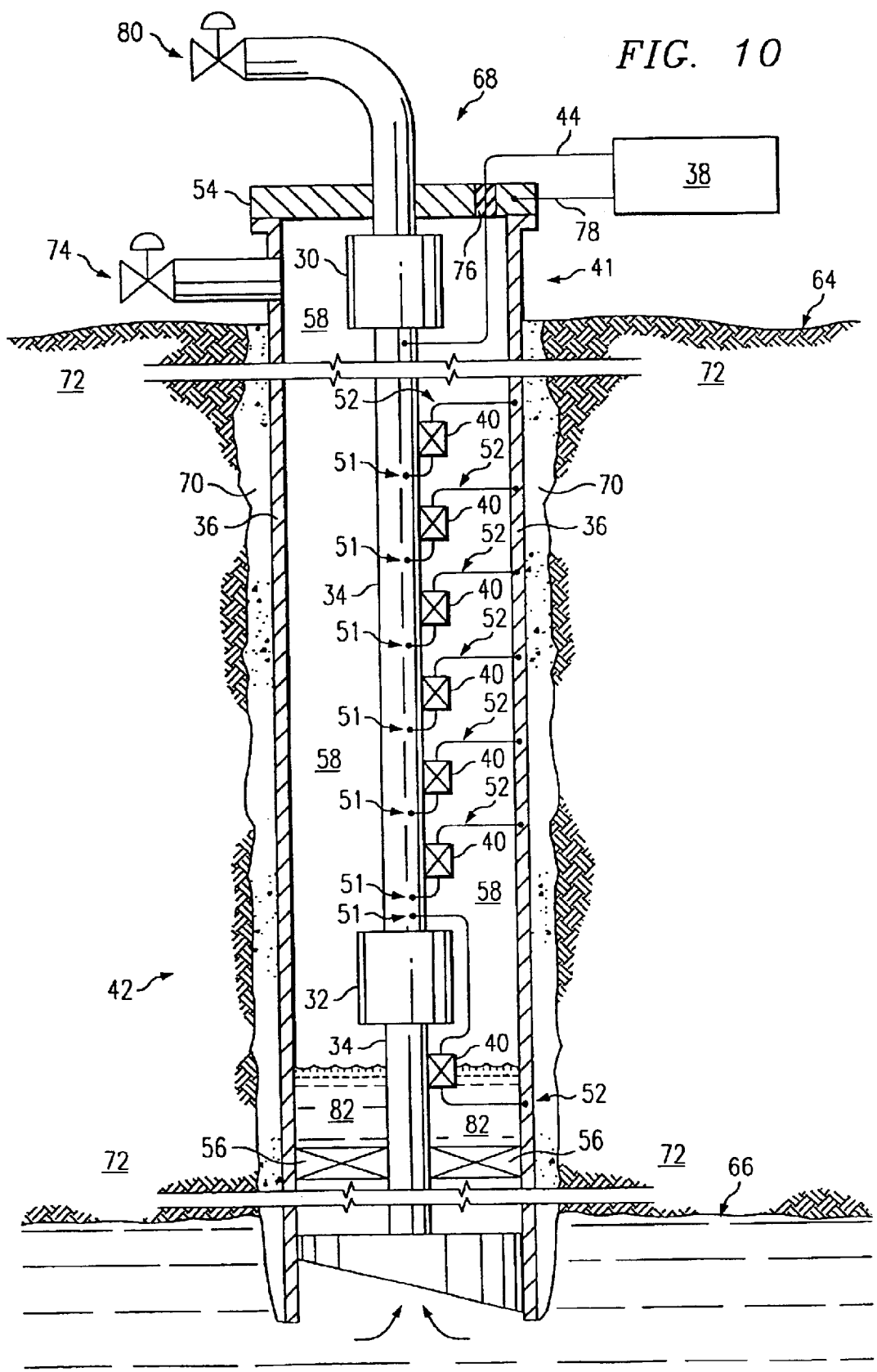
FIG. 10 is a schematic illustrating an alternative configuration of downhole power and communication signal connections.

FIG. 10 illustrates schematically a well similar to that of FIG. 5, furnished with a plurality of downhole electrical control, measurement and communication modules 40. In this embodiment the power for each pod is derived from the voltage developed between the tubing 34 and the casing 36, by the chokes 30 and 32. In contrast to the electrical serial connections of the embodiment of FIG. 5, in the embodiment of FIG. 10 the electrical connections to the downhole modules 40 are in parallel. In this embodiment therefore the voltage which must be applied at the wellhead by the surface equipment 38 through the conductor 44 remains the same regardless of the number of downhole modules, but the current which must be supplied is in proportion to the number of downhole modules. This embodiment would be inoperable so long as conductive fluid were present in the annulus above the lower choke 32, but it has the advantage that the wellhead electrical potential remain's low and therefore safe regardless of the number of downhole modules.

Figure 11:
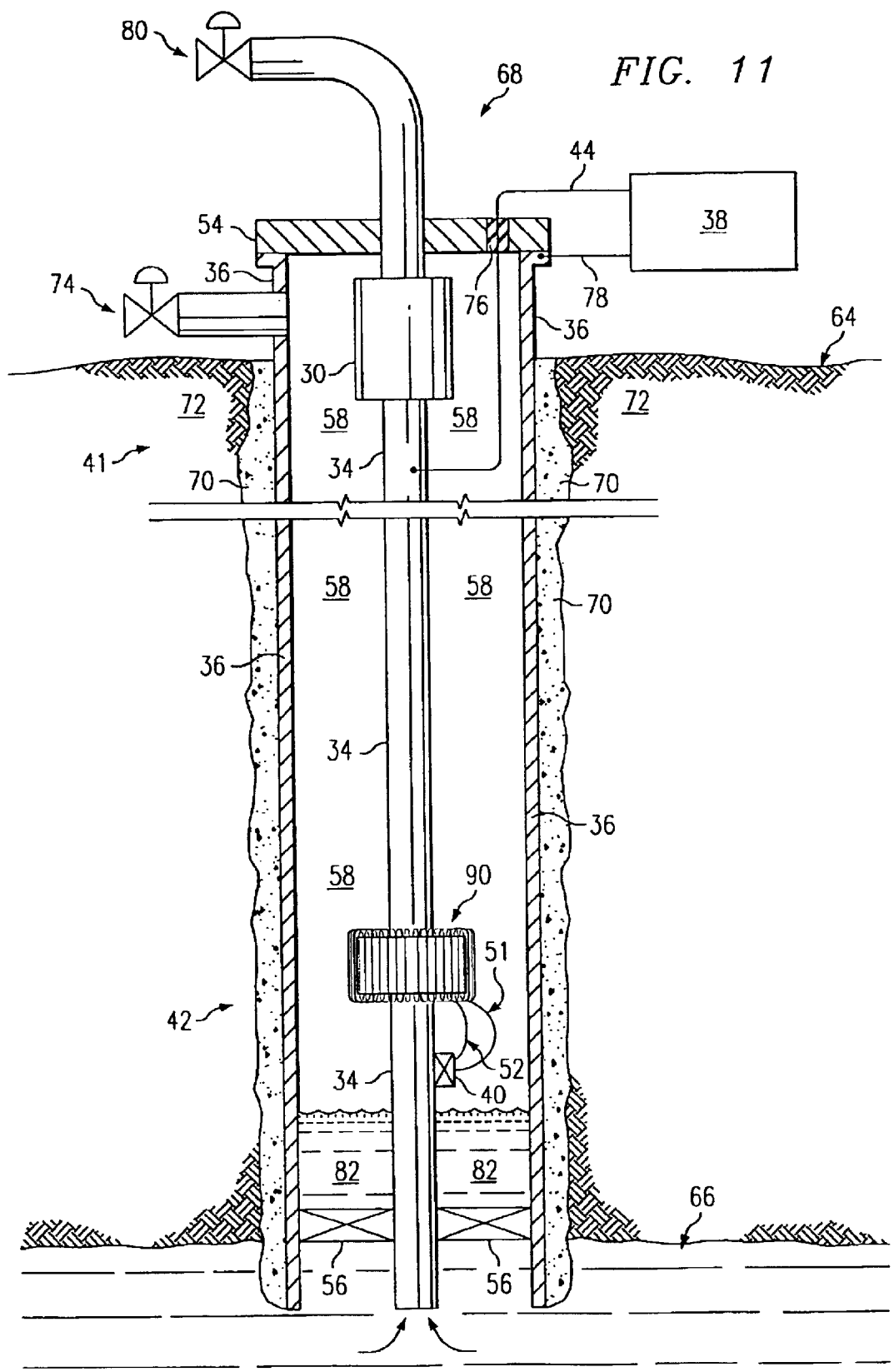
FIG. 11 is a schematic which shows a communication system in accordance with an alternative embodiment of the present invention.

FIG. 11 shows another embodiment of the present invention. In this embodiment, an upper choke 30 is about the First location 41 and an electric power transformer 90 is about the second location 42. Instead of having a choke (32) at the second location 42 (downhole) of the piping structure, a power transformer 90 is used to provide power to a downhole device 40 and the tubing 34 shorts to an electrical return (e.g., conductive fluid 82, packer 56, casing 36) after passing through the power transformer 90.

FIG. 11 illustrates an alternative method for providing electrical power and communications to downhole devices 40 at depth within a well containing a conductive fluid 82 (e.g., saline solution) in the annulus 58 between the casing 36 and the production tubing 34. Because such a conductive fluid 82 can provide high electrical conductance between the tubing 34 and the casing 36, a choke within the well may be ineffective in providing the necessary impedance to current flow between the tubing and the casing to make electricity available to devices 40 drawing power from the tubing directly. However the conductive fluid 82 allows current flow in the tubing 34 to be returned to the surface by the casing 36. When the electric power transformer 90 is above the conductive fluid 82, AC current flow within the tubing 34 acts as the primary winding of the transformer and induces secondary current flow in the toroidal secondary winding (FIG. 12) of the current transformer 90. This secondary current can be used to provide electrical power and communications to the device 40 electrically connected to the transformer 90. Electrical isolation at the well head can take the form of an insulator 84 or isolating choke 30, and in this example a choke 30 is used.

Figure 12:
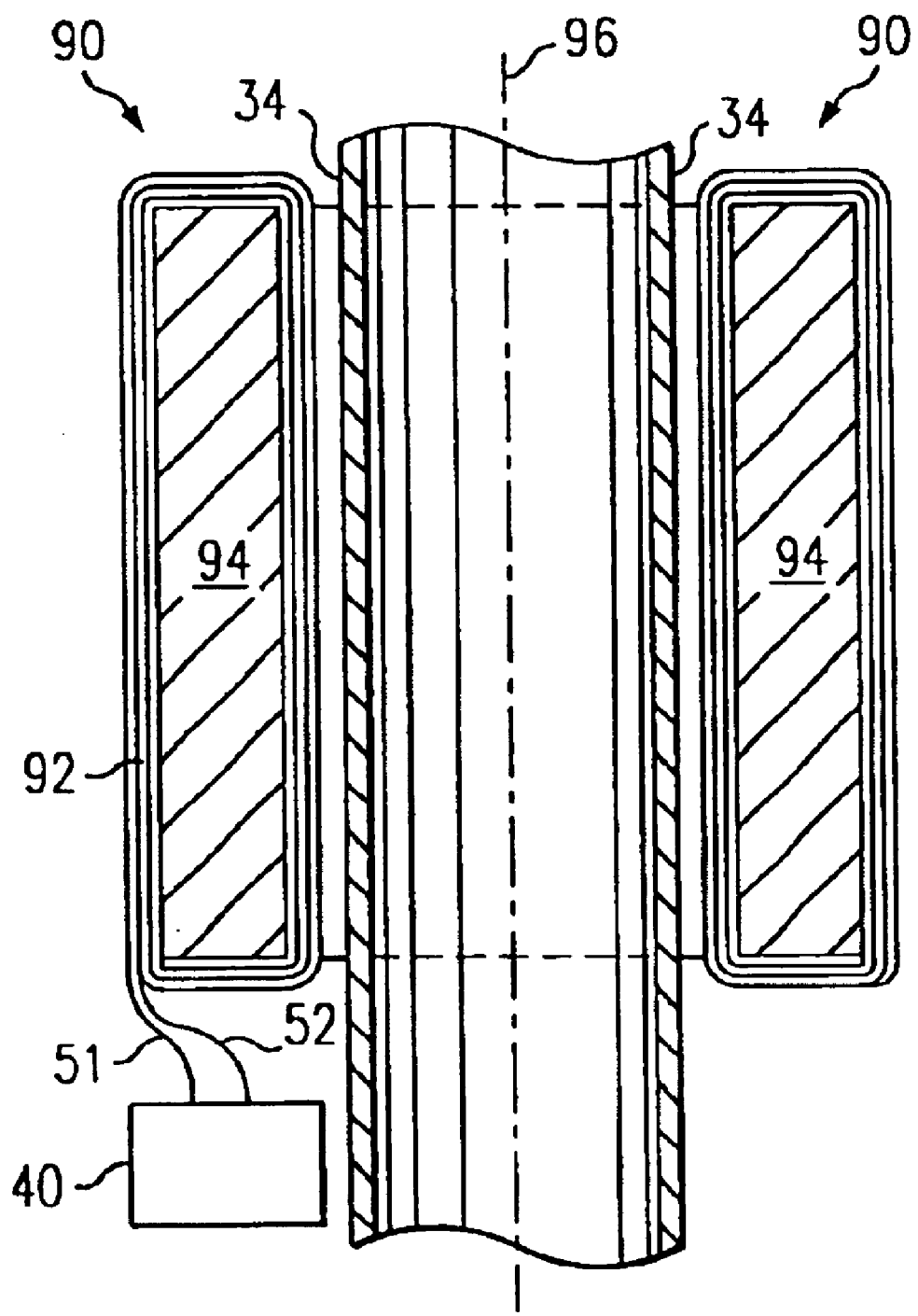
FIG. 12 is an enlarged cut-away vertical portion of the current transformer of FIG. 11 and its connection to a downhole device.

FIG. 12 shows details of the electrical current transformer 90 of FIG. 11. The transformer 90 comprises a ferromagnetic toroid core 94 wound such that the main lengths of the windings 92 are generally parallel to the axis of the toroid 96, following conventional practice for such a transformer. Effectively the tubing 34 acts as the primary winding of such a transformer 90, creating a circular magnetic field axially symmetric about the tubing axis, which is aligned with the transformer axis 96. This magnetic field induces an electrical current in the secondary winding 92, and this current is available to power electrical or electronic equipment within the device 40 electrically connected to the current transformer secondary winding 92. The geometry, number of turns, length, and materials can vary for the transformer 90, depending on the application needs. As with the other embodiments described above, the device 40 can vary depending on the application needs.

Figure 13:
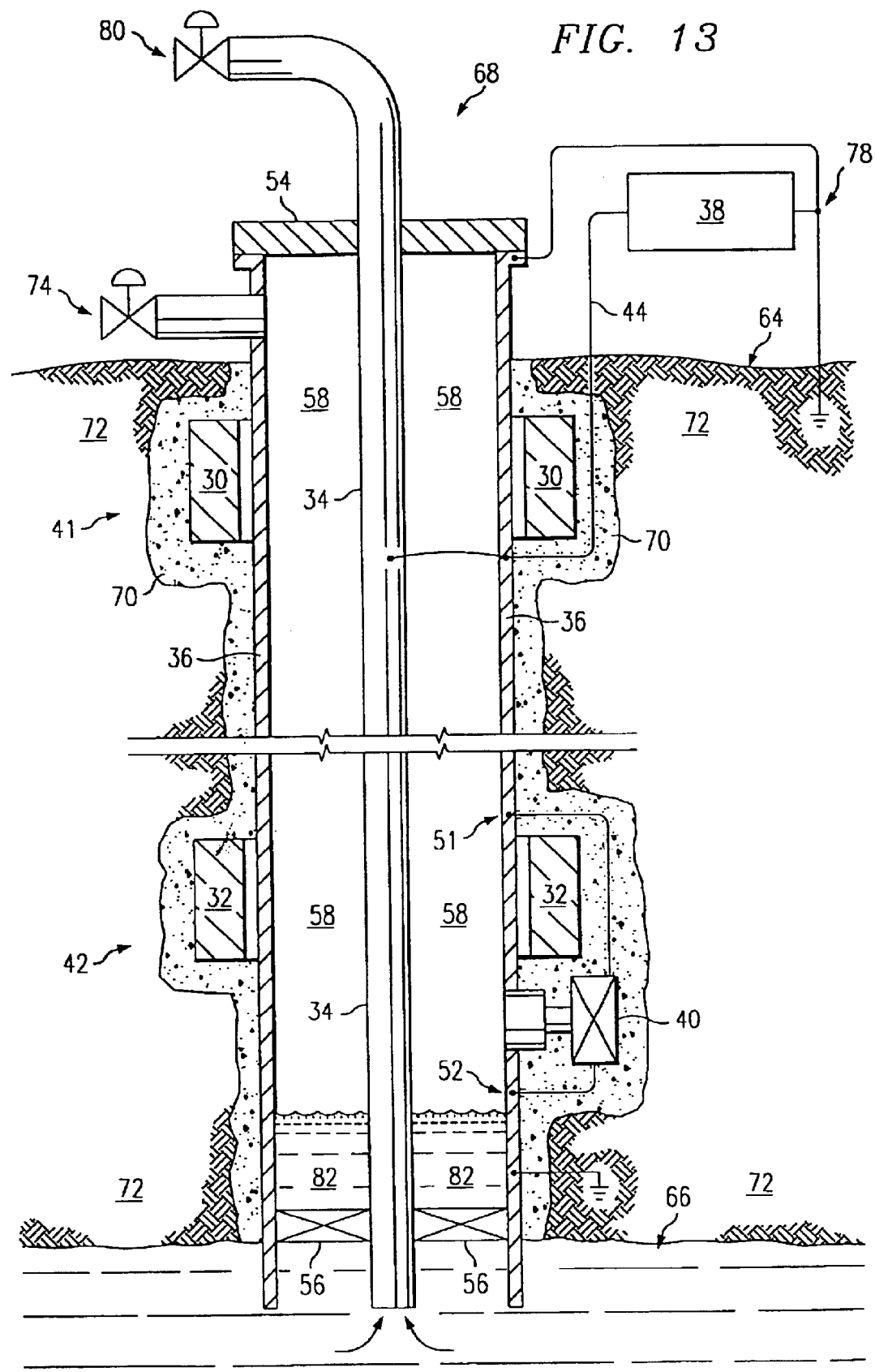
FIG. 13 is a schematic showing a system with an alternative embodiment of the present invention using chokes external to the casing.

FIG. 13 shows another embodiment of the present invention. In this embodiment the chokes 30, 32 are external to the casing 36 and encased in cement 70. Hence, the piping structure comprises the tubing 34 and the casing 36, and the electrical return comprises the earthen ground 72. Thus, the casing 36 and tubing 34 can be used as the piping structure for carrying the power and communication signals to electronics module 40 external to the casing and at depth in the well. Cement 70 between the casing 36 and earthen ground 72 can generally electrically isolate the casing 36 from the earth 72, but may be electrically lossy. The analysis of the action of chokes thus disposed was provided with reference to FIGS. 4c and 4d.

Even though many of the examples discussed herein are applications of the present invention in petroleum wells, the present invention also can be applied to other types of well, including but not limited to: water wells and natural gas wells.

Also in a possible embodiment (not shown) of the present invention, the piping structures of two adjacent wells can be used to form a current loop for the electrical circuit. For example, a second location of a piping structure of a first well may be electrically connected (e.g., via a wire, conductive fluid, and/or the earth) to a second location of a piping structure of a second well adjacent to the first well, and a first location of the piping structure of the first well is electrically connected to a first terminal of a power source and a first location of the piping structure of the second well is electrically connected to a second terminal of the source, such that the electrical circuit is formed by using the piping structures of both wells. Hence, one of the piping structures will act as an electrical return. In another possible embodiment (not shown), two piping structures of a same well (e.g., two adjacent lateral branches) can be used to form a current loop for an electrical circuit. For example, the piping structure can be a first lateral branch and the electrical return can be a second lateral branch.

One skilled in the art will see that the present invention can be applied in many areas where there is a need to provide power and communication within a borehole, well, or any other area that is difficult to access. As discussed above, a production tubing string, as used in oil fields for withdrawing oil from a reservoir, is an example of a well with limited access downhole. Another example is the use of the present invention to provide power and communications to a device within a borehole of a machine part, where access within the borehole is limited. For example, when looking for cracks in a steam turbine using nondestructive testing techniques (e.g., ultrasonics, eddy current), there is often a need to provide power and communications to a sensor deep within a borehole of the steam turbine rotor that may be three to six inches in diameter and thirty feet long. The piping structure can comprise a rod or tube that physically supports the sensor, and the electrical return can comprise the machine part being inspected. Hence, the use of the present invention can provide a system and method of providing power and communications to a sensor deep within the borehole where access is limited.

Also, one skilled in the art will see that the present invention can be applied in many areas where there is an already existing conductive piping structure and a need to route power and communications in a same or similar path as the piping structure. A water sprinkler system or network in a building for extinguishing fires is an example of a piping structure that may be already existing and having a same or similar path as that desired for routing power and communications. In such case another piping structure or another portion of the same piping structure may be used as the electrical return. The steel structure of a building may be used as a piping structure and/or electrical return for transmitting power and communications in accordance with the present invention. The steel rebar in a concrete dam or a street may be used as a piping structure and/or electrical return for transmitting power and communications in accordance with the present invention. The transmission lines and network of piping between wells or across large stretches of land may be used as a piping structure and/or electrical return for transmitting power and communications in accordance with the present invention. Surface refinery production pipe networks may be used as a piping structure and/or electrical return for transmitting power and communications in accordance with the present invention. Thus, there are numerous applications of the present invention in many different areas or fields of use.

It will be appreciated by those skilled in the art having the benefit of this disclosure that this invention provides a system and method of communicating among devices via a piping structure using at least one induction choke about the piping structure to route a time-varying current carrying communication signals between the devices. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

We claim:

1. A power distribution system comprising:
    a piping structure comprising a first location, a second location, and an electrically conductive portion extending between said first and second locations, wherein said first and second locations are distally spaced along said piping structure;
    a first device electrically connected to said electrically conductive portion of said piping structure along said first location, said first device being adapted to use a time-varying current;
    a second device electrically connected to said electrically conductive portion of said piping structure along said second location, said second device being adapted to use a time-varying current; and
    an induction choke located about a portion of said piping structure, said induction choke being adapted to route time-varying current within said piping structure, and such that said first device and said second device are operable using a time-varying current applied to said piping structure.

2. A power distribution system in accordance with claim 1, wherein said induction choke comprises ferromagnetic material.

3. A power distribution system in accordance with claim 1, wherein said induction choke is unpowered.

4. A power distribution system in accordance with claim 1, wherein said induction choke is generally toroidal shaped and is generally concentric about said piping structure.

5. A power distribution system in accordance with claim 1, wherein said choke is generally cylindrical shaped having a generally cylindrical borehole formed therethrough.

6. A power distribution system in accordance with claim 1, wherein said induction choke is substantially electrically insulated from said piping structure.

7. A power distribution system in accordance with claim 1, wherein said time-varying current is an alternating current.

8. A power distribution system in accordance with claim 1, wherein at least a portion of said piping structure is within a petroleum well.

9. A power distribution system in accordance with claim 8, wherein said second location extends downhole, and wherein at least a portion of said first location is between said second location and the surface.

10. A power distribution system in accordance with claim 8, wherein said first location is downhole, and said second location is part of a lateral branch of said well.

11. A power distribution system in accordance with claim 8, wherein said piping structure comprises at least a portion of a production tubing string.

12. A power distribution system in accordance with claim 8, wherein said piping structure comprises at least a portion of a well casing.

13. A power distribution system in accordance with claim 8, wherein said piping structure comprises at least a portion of a liner for a lateral branch of said well.

* * * * *